(12) United States Patent
Swaminathan et al.

(10) Patent No.: US 11,966,971 B2
(45) Date of Patent: *Apr. 23, 2024

(54) COMPUTER-IMPLEMENTED MORTGAGE PROCESSING SYSTEM AND METHOD FOR FACILITATING A MORTGAGE FULFILLMENT PROCESS

(71) Applicant: Sutherland Global Services Inc., Pittsford, NY (US)

(72) Inventors: Krishnan Swaminathan, Manvel, TX (US); Premanandh Premkumar, Tamil Nadu (IN); Velavan Nachimuthu, Tamil Nadu (IN); Mohan Kandasamy, Tamil Nadu (IN); ManiSelvan Selvaraj, Tamil Nadu (IN); Subramanian Avadaiappan, Tamil Nadu (IN); Ganesh RajMohan Parimelazhagan, Tamil Nadu (IN)

(73) Assignee: Sutherland Global Services Inc., Pittsford, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/547,638

(22) Filed: Dec. 10, 2021

(65) Prior Publication Data

US 2022/0101429 A1 Mar. 31, 2022

Related U.S. Application Data

(63) Continuation of application No. 16/145,556, filed on Sep. 28, 2018, now Pat. No. 11,238,529.

(Continued)

(51) Int. Cl.
*G06Q 40/03* (2023.01)
*G06Q 50/16* (2012.01)
(Continued)

(52) U.S. Cl.
CPC ........... *G06Q 40/03* (2023.01); *G06Q 50/167* (2013.01); *H04L 51/046* (2013.01); *H04L 51/216* (2022.05)

(58) Field of Classification Search
None
See application file for complete search history.

(56) References Cited

U.S. PATENT DOCUMENTS

| | | |
|---|---|---|
| 2014/0289099 A1 | 9/2014 | Meyer et al. |
| 2016/0140654 A1* | 5/2016 | Bhat ............... G06Q 10/06316 |
| | | 705/7.26 |

* cited by examiner

*Primary Examiner* — Scott S Trotter
*Assistant Examiner* — Amit Patel
(74) *Attorney, Agent, or Firm* — Woods Oviatt Gilman LLP; Dennis B. Danella, Esq

(57) ABSTRACT

A system for facilitating a mortgage fulfillment process between a mortgage processor computing device and a borrower computing device is provided. The system comprises a mortgage operations module of the server and a borrower interface module of the borrower computing device that are configured to allow for communication and display of an identification of a plurality of required mortgage application documents, association of one or more data files with one or more of the plurality of required mortgage application documents, and communication of the one or more associated data files from the borrower computing device to the server. An indicia that the one or more data files were received by the server may be displayed on the borrower computing device and/or the mortgage processor computing device. A method for implementing the processes described herein is also provided.

30 Claims, 34 Drawing Sheets

Related U.S. Application Data

(60) Provisional application No. 62/564,423, filed on Sep. 28, 2017.

(51) Int. Cl.
*H04L 51/046* (2022.01)
*H04L 51/216* (2022.01)

FIG. 5E

DIGITAL (FUTURE STATE) CLOSING CALENDAR

DIGITAL OPERATIONS CLOSING CALENDAR

| DAY 1 | DAY 2 | DAY 3 | DAY 4 | DAY 5 | DAY 6 | DAY 7 |
|---|---|---|---|---|---|---|
| QLR COMPLETE + SUBMITTED TO UW | UNDERWRITING REVIEW | UNDERWRITING REVIEW | LOAN CONDITIONALLY APPROVED | INTRODUCTION CALL + NEEDS LETTER EMAIL | MANUAL PUSH NOTIFICATION | MANUAL PUSH NOTIFICATION |
| DAY 8 | DAY 9 | DAY 10 | DAY 11 | DAY 12 | DAY 13 | DAY 14 |
| MANUAL PUSH NOTIFICATION | BORROWER DOCS RECEIVED AND REVIEWED | LOAN SUBMITTED TO UNDERWRITING (FINAL APPROVAL) | UNDERWRITING REVIEW | ADDITIONAL CONDITIONS RECEIVED | FOLLOW-UP FOR ADDITIONAL DOCS CALL + EMAIL | MANUAL PUSH NOTIFICATION |
| DAY 15 | DAY 16 | DAY 17 | DAY 18 | DAY 19 | DAY 20 | DAY 21 |
| BORROWER DOCS RECEIVED AND REVIEWED | LOAN SUBMITTED TO UNDERWRITING (FINAL APPROVAL) | UNDERWRITING REVIEW | FINAL APPROVAL RECEIVED | FINAL APPROVAL & LOAN SCHEDULING CALL + EMAIL | LOAN SUBMITTED TO CLOSING | INITIAL CLOSING DISCLOSURE ISSUED TO BROWSER |
| DAY 22 | DAY 23 | DAY 24 | DAY 25 | DAY 26 | DAY 27 | DAY 28 |
| INITIAL DISCLOSURE DISCUSSION WITH BORROWER | WAITING TIME | WAITING TIME | WAITING TIME | WAITING TIME | FINAL CLOSING PACKAGE ISSUED TO TITLE | FINAL CLOSING PUSH NOTIFICATION |
| DAY 29 | | | | | | |
| LOAN CLOSED | | | | | | |

FIG. 8

| DAY 5 |
|---|
| INTRODUCTION CALL + NEEDS LETTER EMAIL |

| | AUTO PUSH NOTIFICATION FOR NEEDS LETTER | |
|---|---|---|
| NEEDS LETTER NOTIFICATION | | |
| PENDING ITEMS | | STATUS |
| NEED MOST RECENT 30 DAY PAY-STUB | | REQUESTED |
| NEED MOST RECENT 30 DAY BANK STATEMENT | | REQUESTED |
| NEED COPY OF DIVORCE DECREE | | REQUESTED |
| NEED CURRENT HOMEOWNERS INSURANCE | | REQUESTED |
| NEED LETTER OF EXPLANATION FOR LARGE DEPOSITES | | REQUESTED |
| NEED COPY OF SOCIAL SECURITY CARD | | REQUESTED |
| NEED GIFT LETTER FOR DOWN PAYMENT | | REQUESTED |
| NEED LETTER OF EXPLANATION FOR SSN MISMATCH | | REQUESTED |

FIG. 9A

| DAY 6 |
|---|
| MANUAL PUSH NOTIFICATION |

| NEEDS LETTER NOTIFICATION | |
|---|---|
| PENDING ITEMS | STATUS |
| NEED MOST RECENT 30 DAY PAY-STUB | RECEIVED |
| NEED MOST RECENT 30 DAY BANK STATEMENT | RECEIVED |
| NEED COPY OF DIVORCE DECREE | RECEIVED |
| NEED CURRENT HOMEOWNERS INSURANCE | REQUESTED |
| NEED LETTER OF EXPLANATION FOR LARGE DEPOSITES | REQUESTED |
| NEED COPY OF SOCIAL SECURITY CARD | REQUESTED |
| NEED GIFT LETTER FOR DOWN PAYMENT | REQUESTED |
| NEED LETTER OF EXPLANATION FOR SSN MISMATCH | REQUESTED |

FIG. 9B

| DAY 7 |
|---|
| MANUAL PUSH NOTIFICATION |

| NEEDS LETTER NOTIFICATION | |
|---|---|
| PENDING ITEMS | STATUS |
| NEED MOST RECENT 30 DAY PAY-STUB | RECEIVED |
| NEED MOST RECENT 30 DAY BANK STATEMENT | RECEIVED |
| NEED COPY OF DIVORCE DECREE | RECEIVED |
| NEED CURRENT HOMEOWNERS INSURANCE | RECEIVED |
| NEED LETTER OF EXPLANATION FOR LARGE DEPOSITES | RECEIVED |
| NEED COPY OF SOCIAL SECURITY CARD | RECEIVED |
| NEED GIFT LETTER FOR DOWN PAYMENT | REQUESTED |
| NEED LETTER OF EXPLANATION FOR SSN MISMATCH | REQUESTED |

FIG. 9C

| DAY 8 | | |
|---|---|---|
| MANUAL PUSH NOTIFICATION | | |
| NEEDS LETTER NOTIFICATION | | |
| PENDING ITEMS | | STATUS |
| NEED MOST RECENT 30 DAY PAY-STUB | | RECEIVED |
| NEED MOST RECENT 30 DAY BANK STATEMENT | | RECEIVED |
| NEED COPY OF DIVORCE DECREE | | RECEIVED |
| NEED CURRENT HOMEOWNERS INSURANCE | | RECEIVED |
| NEED LETTER OF EXPLANATION FOR LARGE DEPOSITES | | RECEIVED |
| NEED COPY OF SOCIAL SECURITY CARD | | RECEIVED |
| NEED GIFT LETTER FOR DOWN PAYMENT | | RECEIVED |
| NEED LETTER OF EXPLANATION FOR SSN MISMATCH | | RECEIVED |

FIG. 9D

| DAY 13 FOLLOW-UP FOR ADDITIONAL DOCS CALL + EMAIL | AUTO PUSH NOTIFICATION FOR ADDITIONAL CONDITIONS | STATUS |
|---|---|---|
| | NEEDS LETTER NOTIFICATION | |
| | PENDING ITEMS | |
| | NEED MOST RECENT 30 DAY PAY-STUB | APPROVED |
| | NEED MOST RECENT 30 DAY BANK STATEMENT | APPROVED |
| | NEED COPY OF DIVORCE DECREE | APPROVED |
| | NEED CURRENT HOMEOWNERS INSURANCE | APPROVED |
| | NEED LETTER OF EXPLANATION FOR LARGE DEPOSITES | APPROVED |
| | NEED COPY OF SOCIAL SECURITY CARD | APPROVED |
| | NEED GIFT LETTER FOR DOWN PAYMENT | APPROVED |
| | NEED LETTER OF EXPLANATION FOR SSN MISMATCH | REQUESTED |
| | NEED COPY OF INSURANCE FOR INVESTEMENT PROP | REQUESTED |

FIG. 9E

| DAY 14 MANUAL PUSH NOTIFICATION | | |
|---|---|---|
| NEEDS LETTER NOTIFICATION | | |
| PENDING ITEMS | | STATUS |
| NEED MOST RECENT 30 DAY PAY-STUB | | APPROVED |
| NEED MOST RECENT 30 DAY BANK STATEMENT | | APPROVED |
| NEED COPY OF DIVORCE DECREE | | APPROVED |
| NEED CURRENT HOMEOWNERS INSURANCE | | APPROVED |
| NEED LETTER OF EXPLANATION FOR LARGE DEPOSITES | | APPROVED |
| NEED COPY OF SOCIAL SECURITY CARD | | APPROVED |
| NEED GIFT LETTER FOR DOWN PAYMENT | | APPROVED |
| NEED LETTER OF EXPLANATION FOR SSN MISMATCH | | RECEIVED |
| NEED COPY OF INSURANCE FOR INVESTEMENT PROP | | RECEIVED |

FIG. 9F

DAY 19
FINAL APPROVAL & LOAN SCHEDULING CALL + EMAIL

AUTO PUSH NOTIFICATION FOR FINAL APPROVAL

NEEDS LETTER NOTIFICATION

| PENDING ITEMS | STATUS |
|---|---|
| NEED LETTER OF EXPLANATION FOR SSN MISMATCH | APPROVED |
| NEED COPY INSURANCE INVESTMENT PROP- | APPROVED |

SELECT YOUR CLOSING DATE

| 5/17/2017 |
|---|
| EARLIEST CLOSING DATE AVAILABLE (4 DAYS OUT) |
| EARLIEST CLOSING DATE AVAILABLE (5 DAYS OUT) |
| EARLIEST CLOSING DATE AVAILABLE (6 DAYS OUT) |
| EARLIEST CLOSING DATE AVAILABLE (7 DAYS OUT) |

FIG. 9G

| | 5/11/2017 | 5/11/2017 | 5/11/2017 |
|---|---|---|---|
| CLOSING DISCLOSURE SENT DATE | | | |
| CLOSING DISCLOSURE RECEIVED DATE | | | |
| CLOSING DISCLOSURE ACKNOLWEDGED DATE | | | |

DAY 22
INITAL DISCLOSURE DISCUSSION WITH BORROWER

AUTO PUSH NOTIFICATION FOR INITIAL CLOSING DISCLOSURE

FIG. 9H

COMPUTER-IMPLEMENTED MORTGAGE PROCESSING SYSTEM AND METHOD FOR FACILITATING A MORTGAGE FULFILLMENT PROCESS

CROSS-REFERENCE TO RELATED APPLICATIONS

This application is a continuation of U.S. patent application Ser. No. 16/145,556, filed Sep. 28, 2018, which claims the benefit of U.S. Patent Application No. 62/564,423, filed Sep. 28, 2017, which are hereby incorporated by reference in their entirety.

FIELD OF THE INVENTION

The present invention relates to a computer-implemented mortgage processing system and method for facilitating a mortgage fulfillment process between a mortgage processor computing device and a borrower computing device; in particular, the system and method comprises a mortgage operations module and a borrower interface module that are configured to allow for the communication and display of an identification of a plurality of required mortgage application documents, the association of a data file with one or more of the identified plurality of required mortgage application documents, the communication of the associated data file, displaying an indicia that such data file was communicated, and analyzing the content of the data file and transforming a digital loan origination document by automatically populating the content from the data file. Other aspects of the system and method are also provided.

BACKGROUND OF THE INVENTION

The current lifecycle for processing a mortgage loan includes four steps—origination, processing, underwriting and closing/funding. The processing of a mortgage loan is typically a time consuming process. The average cycle time for processing a mortgage loan through all four steps is approximately forty-five days, wherein forty-two of those days are spent in the last three steps, which is referred to as the operations cycle. Mortgage processing companies are scored (NPS/CSAT) on the level of service that they provide their customers, which factors in the amount of time it takes to close/fund a loan. Any inefficiencies in the operations cycle due to delays in communications between the loan processor and the borrower cause delays in cycle time and has a direct impact on the customer service scores.

In a typical loan processing cycle, the loan processor and borrower communicate using regular mail and telephone, and documents requested by the loan officer may be sent by the borrower to the loan processor by mail or through email. FIGS. 1 and 2 provide an exemplary illustration of a traditional loan closing calendar and corresponding contacts that are made by the loan processor to the borrower. During the operations cycle, the borrower may not be aware of the documents that the processor may still need in order to continue to process the loan, and there is no coordinated technical solution for the loan processor to remind the borrower of documents that still may be needed. Further, the borrower may be unaware of how much longer it will take to process the loan, which may cause the borrower to become frustrated during the operations cycle. The current process for processing a loan and providing for communication between the borrower and the loan officer is inefficient. Also, once the loan officer finally receives the loan documents from the borrower, the loan officer will manually review the loan documents and enter the relevant information into the loan origination documents. The manual review and entering of the relevant information into the loan origination documents may result in errors that introduce further inefficiencies into the current loan processing system and unsatisfactory to maintain consumer satisfaction.

As such, there is a need for a system and method that will address one or more of the above-referenced drawbacks. The present invention addresses these needs as well as other needs.

BRIEF SUMMARY OF THE INVENTION

As will be described in more detail below, a computer-implemented mortgage processing system for facilitating a mortgage fulfillment process between a mortgage processor computing device and a borrower computing device is provided. In one aspect, the system comprises a server including a memory and a processor, wherein the server is in communication with the mortgage processor computing device and the borrower computing device over a network. The system further includes a first set of computer instructions that when executed by the processor of the server performs the steps of: i) receiving an input request to establish a loan file from the mortgage processor computing device over the network, wherein the input request includes loan data associated with the loan file, wherein the loan data includes an identification of a plurality of required mortgage application documents, ii) generating the loan file and associating the loan data with the generated loan file, iii) allowing for the display of the loan data associated with the loan file on a display of the mortgage processor computing device, and iv) communicating the identification of the plurality of required mortgage application documents to the borrower computing device over the network. The system further includes a second set of computer instructions configured for being stored in a memory of the borrower computing device and executed by a processor of the borrower computing device to perform the steps of: i) receiving the identification of the plurality of required mortgage application documents from the server over the network associated with the loan file, ii) displaying the identification of the plurality of required mortgage application documents on a display of the borrower computing device, iii) associating a data file stored in the memory of the borrower computing device with one of the plurality of required mortgage application documents, iv) communicating the associated data file to the server over the network. The server is configured to receive the associated data file and make the associated data file available to the mortgage processor computing device. An indicia is displayed on the display of at least one of the borrower computing device or the mortgage processor computing device in association with the one of the plurality of required mortgage application documents, wherein the indicia provides an indication as to whether the associated data file was received by the server. For example, the method may provide for the display of one of a plurality of status indicators on the mortgage processor computing device corresponding to the indicia on the display of the mortgage processor computing device, wherein the plurality of status indicators includes a plurality of different colors.

In another aspect, the first set of computer instructions is further configured for performing the steps of temporarily storing the associated data file in the memory of the server after the server receives the associated data file, and providing for a drag and drop operation to allow for the associated data file to be communicated to the mortgage processor computing device and stored in the memory of the mortgage processor computing device.

In another aspect, a loan origination document is stored in the memory of the mortgage processor computing device, wherein the loan origination document includes a plurality of loan origination data fields configured for receiving loan data, and wherein the first set of computer instructions is further configured for performing the steps of: after the server receives the associated data file, analyzing the associated data file to extract loan data from the associated data file, and automatically populating at least one of the plurality of loan origination data fields with the extracted loan data. The step of analyzing the associated data file may be performed using at least one of robotics process automation (RPA) or screen-scraping. Also, the loan data extracted from the associated data file may be modified or transformed (used in a calculation) prior to automatically populating the at least one of the plurality of loan origination data fields with the modified or transformed extracted loan data.

In another aspect, a method programmed for execution in a computing environment for facilitating a mortgage fulfillment process between a mortgage processor computing device and a borrower computing device is provided. The mortgage processor computing device and a borrower computing device are in communication with a server over a network. The server includes a processor and a memory, wherein the processor is configured for executing computer instructions for performing the method comprising: a) receiving an input request to establish a loan file from the mortgage processor computing device over the network, wherein the input request includes loan data associated with the loan file, and wherein the loan data includes an identification of a plurality of required mortgage application documents; b) generating the loan file and associating the loan data with the generated loan file; c) allowing for the display of the loan data associated with the loan file on a display of the mortgage processor computing device; d) communicating the identification of the plurality of required mortgage application documents to the borrower computing device over the network; e) receiving a data file associated with one of the plurality of required mortgage application documents from the borrower computing device over the network; f) making the associated data file available to the mortgage processor computing device over the network; and g) allowing for the display of an indicia on the display of the mortgage processor computing device in association with the one of the plurality of required mortgage application documents, wherein the indicia provides an indication as to whether the associated data file was communicated by the borrower computing device to the server over the network. The additional aspects mentioned above with respect to the system also may be used in the method.

In another aspect, it should be understood that the methods set forth above may be embodied in computer readable instructions stored on a non-transitory computer readable medium.

Additional aspects, objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein:

FIGS. 5A-5F are exemplary screen shots of a user interface provided by the mortgage operations module for display on a mortgage processor computing device over a network;

FIG. 8 is an exemplary loan closing calendar implementing the present invention;

FIGS. 9A-9I are detailed views of portions of FIG. 9;

DETAILED DESCRIPTION OF THE INVENTION

Figure 1:
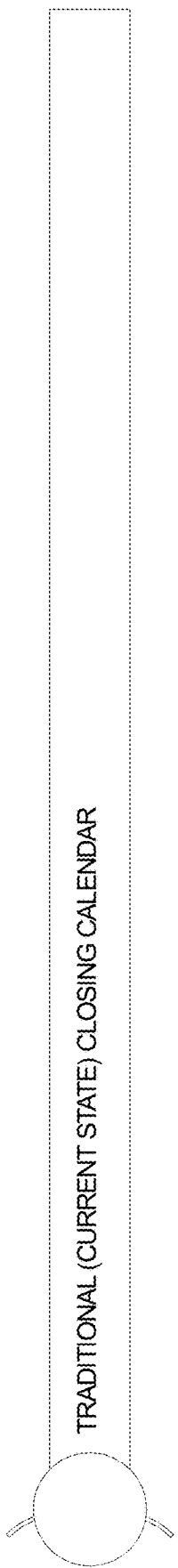
FIG. 1 is an illustration of a traditional closing calendar for a mortgage loan.
Figure 2:
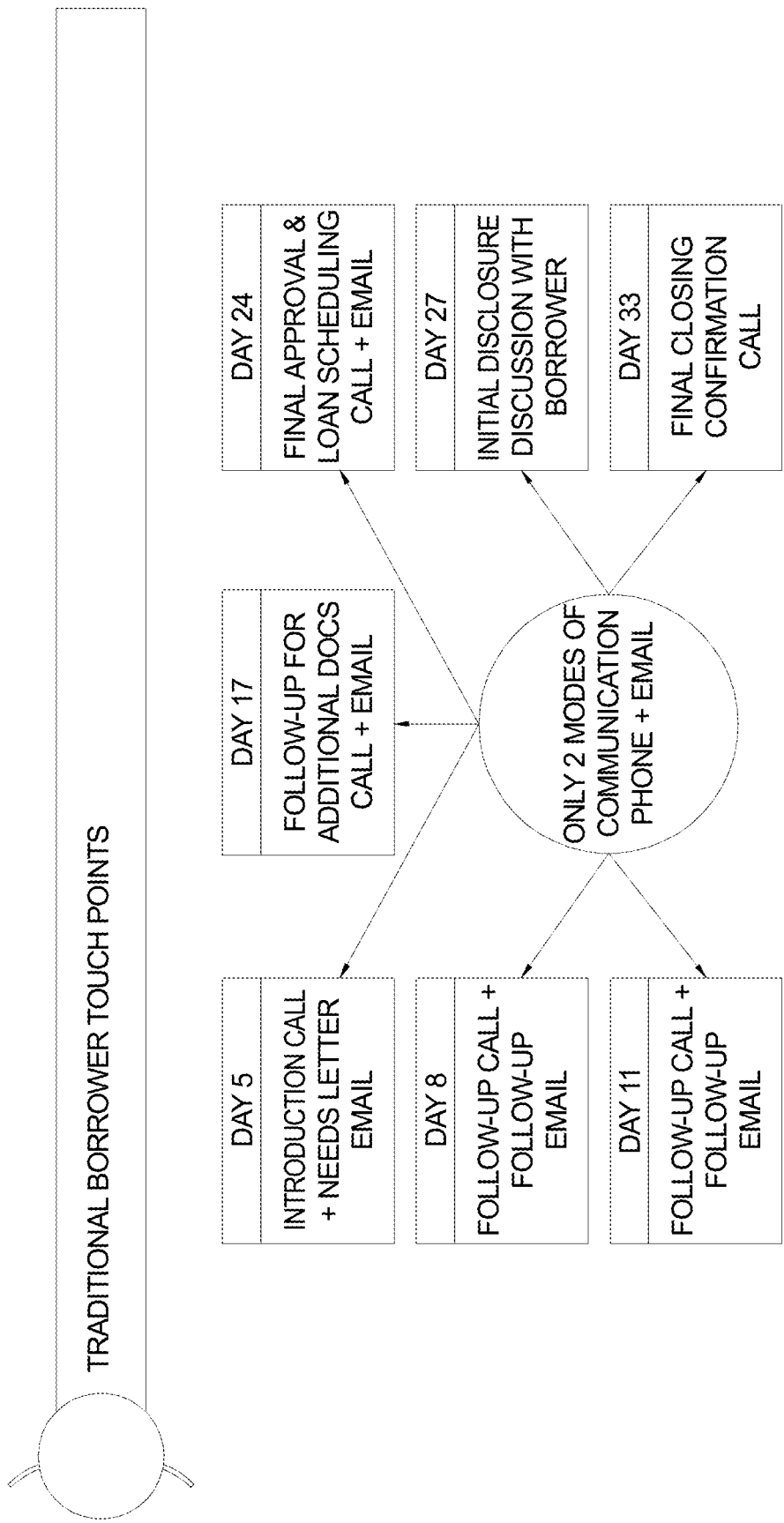
FIG. 2 is an illustration of traditional communications that are made between a loan processor and a borrower.

Generally, the system, tools and methods described herein for facilitating a mortgage loan fulfillment may be implemented in hardware, software, and combinations thereof. Referring to the drawings in detail, and specifically to FIG. 3, reference numeral 100 generally designates an exemplary network environment in which a computer-implemented mortgage loan processing system in accordance with one aspect of the invention may be implemented. System 100 utilizes one or more computing devices to facilitate the exchange of information between a borrower computing device and mortgage processor computing device that is required to process a mortgage loan, allow the mortgage processor computing device to follow up on information that has not been received by borrower computing device, and keep the borrower, realtor, and/or origination loan officer updated on the progress of the loan process. While the discussion herein refers specifically to a mortgage loan processing system, it should be understood that the system may be used in conjunction with other types of loan processing systems.

For instance, system 100 may include a server 102, a mortgage processor computing device 104, and a borrower computing device 106 in communication with each other over a network 108. In addition, a realtor computing device 110 and a loan officer computing device 112 may also be in communication with server 102 and computing devices 104, 106 over network 108. Network 108 may be any type of network, such as a wide area network or local area network that allows for wired and/or wireless communication between server 102 and computing devices 104, 106, 110, 112. It should be understood that server 102 and computing devices 104, 106, 110, 112 may be a desktop computer, smartphone, tablet, or any other type of mobile computing device that includes a processor configured for implementing computer-executable instructions and methods as described herein.

In accordance with an aspect of the present invention, server 102 includes a processor and a memory having a mortgage operations module 114 stored therein. Mortgage operations module 114 includes a first set of computer-executable instructions configured for performing, through the use of the processor, a number of algorithmic steps that facilitate the mortgage fulfillment process. In particular, mortgage operations module 114 may be a cloud-based software platform that is accessible by mortgage processor computing device 104 over network 108. Mortgage processor computing device 104 utilizes mortgage operations module 114 to, among other things, allow for the communication of loan documents from borrower computing device 106 to a data store/memory 116 of mortgage processor computing device 104 so that the content of the communicated loan documents can be used in a loan origination module 118. Loan origination module 118 may include a set of computer-executable instructions stored in a memory of mortgage processor computing device 104 and configured for processing the mortgage loan with the objective of receiving approval from a lender (e.g., bank) to loan a specified amount of money to the borrower. It should be understood that server 102 may be controlled by the same or different business entity that controls the mortgage processor computing device 104.

Figure 5A:
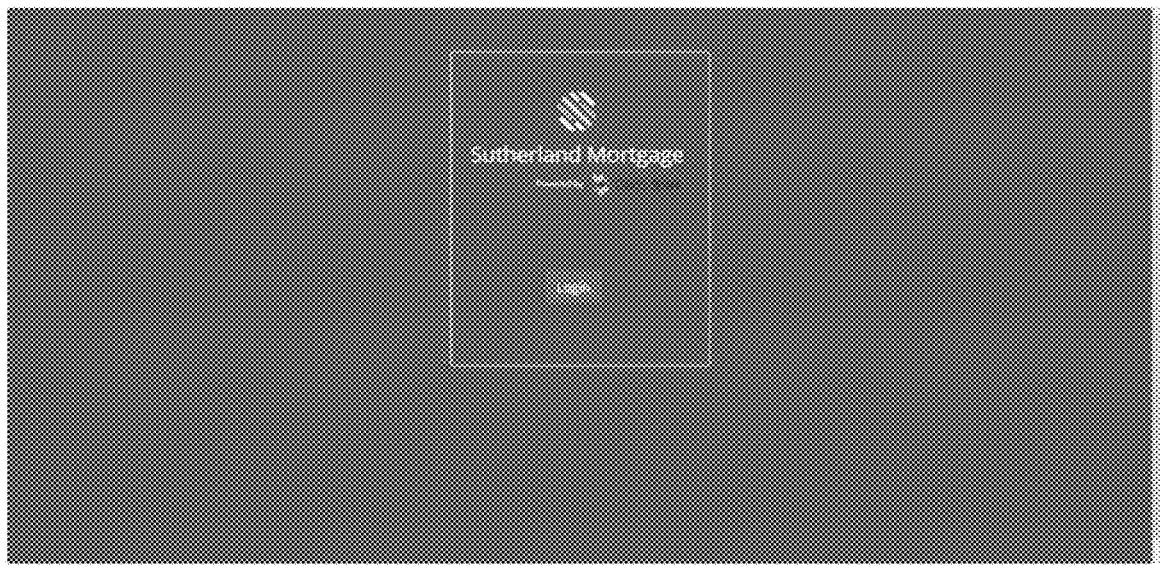

A series of exemplary screen shots are provided in FIGS. 5A-5F illustrating the functionality that may be provided by mortgage operations module 114. The description of mortgage operations module 114 provided below will refer to some of these screen shots. As seen in FIG. 5A, mortgage operations module 114 provides a login interface that provides access to a loan processor if proper authentication is entered. Further, FIGS. 5B and 5C display information related to the loan(s), including loan data 502.

Figure 4:
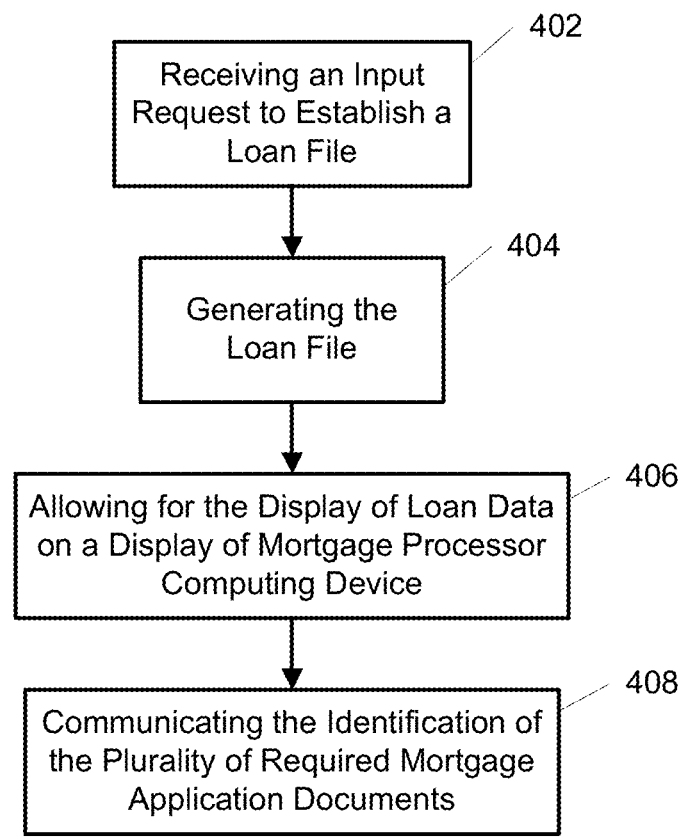
FIG. 4 is an algorithmic flow chart showing exemplary operations of a mortgage operations module.
Figure 5B:
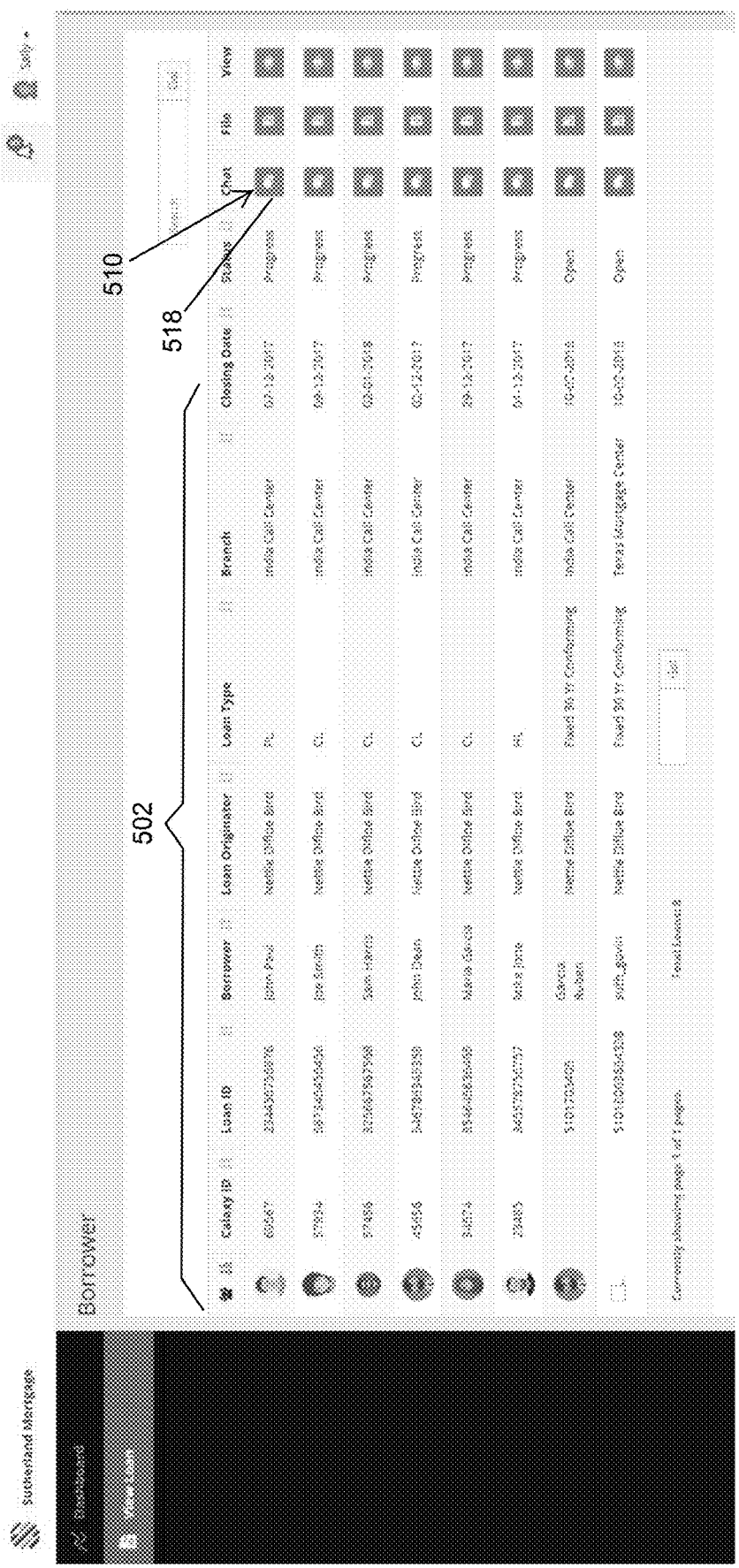
Figure 5C:
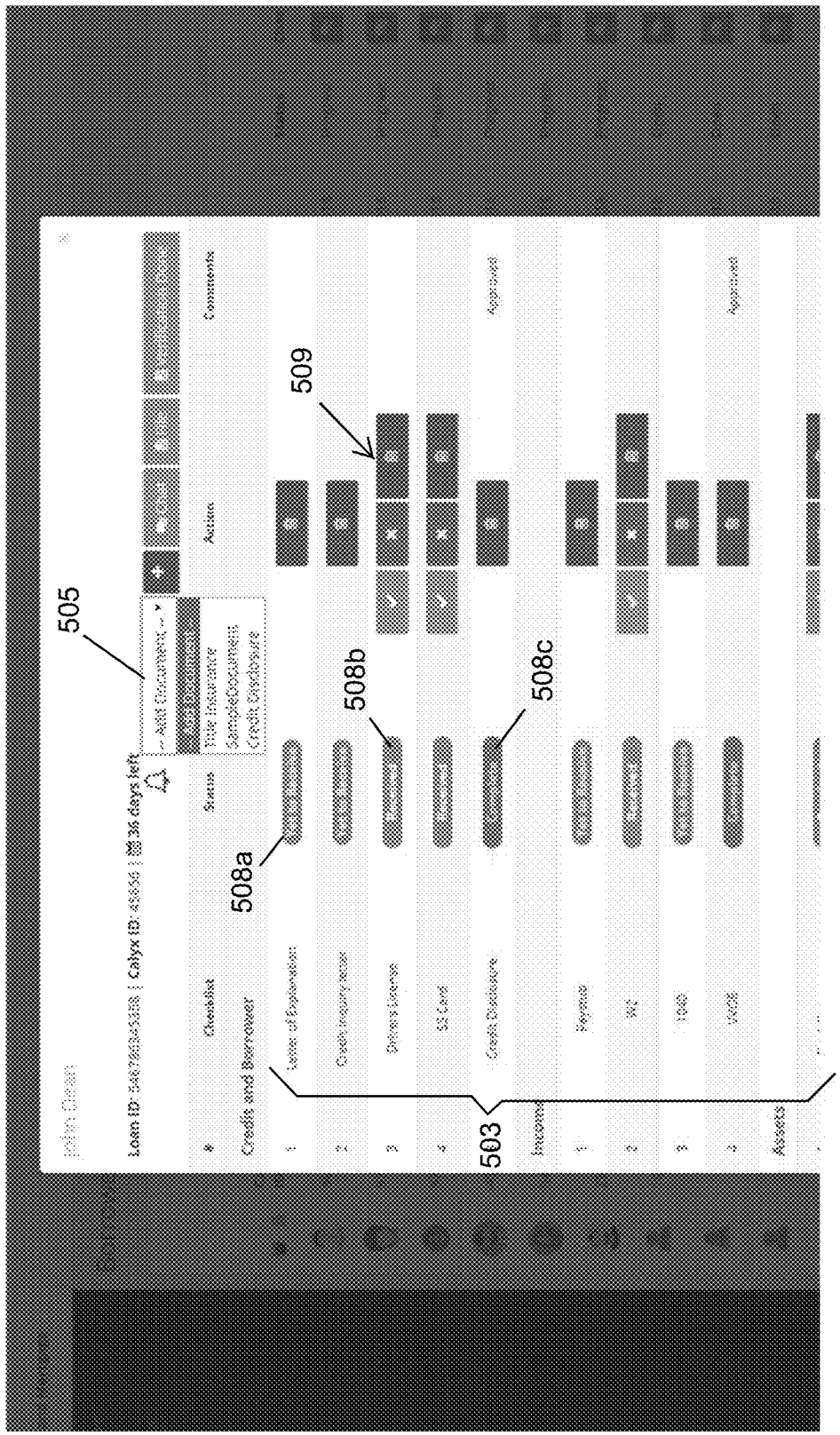

As seen in FIG. 4, mortgage operations module 114 is configured for processing an algorithm that comprises the step of receiving an input request at server 102 to establish a loan file from mortgage processor computing device 104 over network 108 at step 402. The input request may be generated in response to a mortgage application request from an origination loan officer and/or a borrower using loan officer computing device 112 and borrower computing device 106, respectively. The input request includes loan data received from loan officer computing device 112 and/or borrower computing device 106 that is associated with the loan file, wherein the loan data may include at least one of an identification (e.g., a list) of a plurality of required mortgage application documents, a loan number, borrower information, a loan amount, a loan rate, a loan term, a loan close date, a loan rate lock date, or a countdown to the loan close date or loan rate lock date. The plurality of required mortgage application documents related to the credit, income and assets of a borrower, which may include, but is not limited to, a paystub, a letter of explanation, a W-2 form, income tax forms, a credit report, a driver's license, social security card, or a bank statement. It should be understood that the aforementioned loan data may be stored in data store 116 and/or loan origination module 118. At step 404, mortgage operations module 114 is configured further implement the algorithm by generating the loan file, associating the loan data with the generated loan file, and storing the loan file and associated loan data in a data store/memory 120. At step 406, mortgage operations module 114 is configured to further implement the algorithm by allowing for the display of the loan data associated with the loan file on a display of mortgage processor computing device 104 over network 108, including a list of the plurality of required mortgage application documents 503 (FIG. 5C). As seen in FIG. 5B, loan data 502 is displayed for a plurality of different borrowers that are in different stages of the mortgage fulfillment process. Mortgage operations module 114 is further configured to implement the algorithm by communicating the identification of the plurality of required mortgage application documents to borrower computing device 106 over network 108 at step 408. Mortgage operations module 114 may also allow for the deletion or addition 505 of required mortgage application documents 503 from the list displayed on mortgage processor computing device 104. As such, mortgage operations module 114 allows mortgage processor computing device 104 to communicate with borrower computing device 106 over network 108 to identify the required plurality of required mortgage application documents, and keep track of the receipt of such documents to make the mortgage approval process more transparent and efficient.

Figure 3:
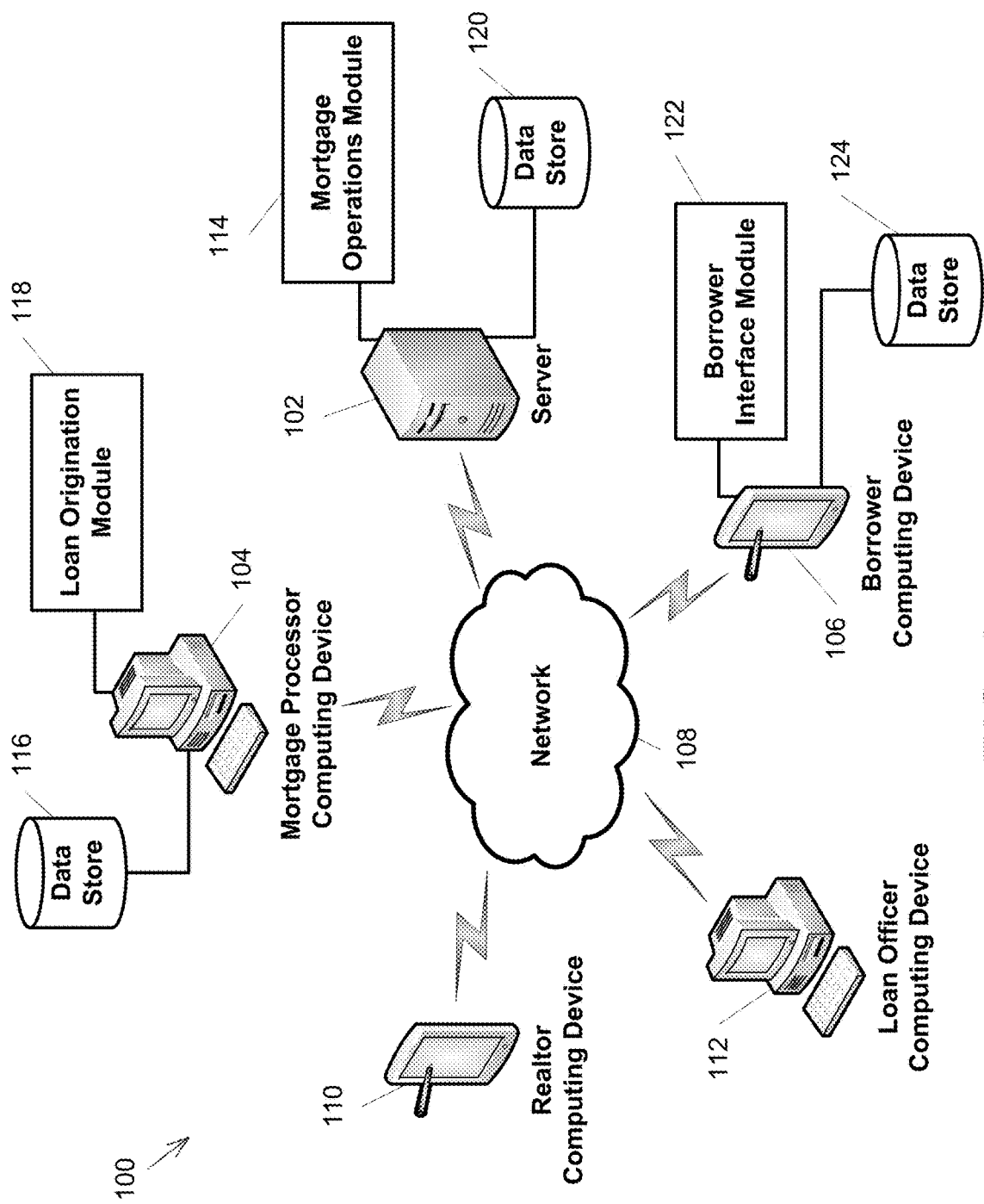
FIG. 3 is a schematic drawing showing an exemplary system that may be used to implement any of the methods or processing described herein in accordance with one aspect of the present invention.
Figure 7A:
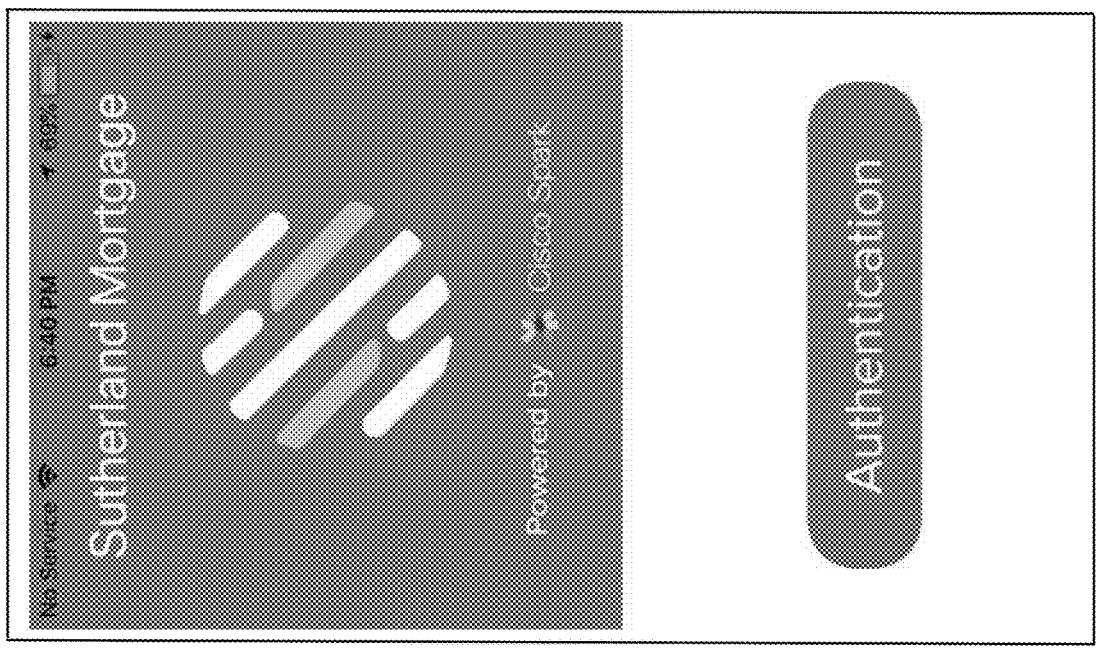
FIGS. 7A-7F are exemplary screen shots of a user interface provided by the borrower interface module.

In a further aspect, as best seen in FIG. 3, the present invention includes a borrower interface module 122 including a second set of computer executable instructions stored in a memory of borrower computing device 106. Borrower interface module 122 includes computer executable instructions configured for performing, through the use of the processor of borrower computing device 106, a number of algorithmic steps that facilitate the mortgage fulfillment process when used in conjunction with mortgage operations module 114. Borrower interface module 122 may be in the form of a mobile software application (i.e., mobile app) or any other type of software program that can be easily downloaded and used by a borrower to interact with mortgage processor computing device 104, provide the information necessary to complete the mortgage fulfillment process, and keep apprised of the status of the mortgage fulfillment process. A series of exemplary screen shots are provided in FIGS. 7A-7E illustrating the functionality that may be provided by borrower interface module 122. The description of borrower interface module 122 provided below will refer to some of these screen shots. As seen in FIG. 7A, borrower interface module 122 provides a login interface that provides access to a borrower if proper authentication is entered. Further, FIG. 7B displays information related to the loan, including loan data 502.

Figure 6:
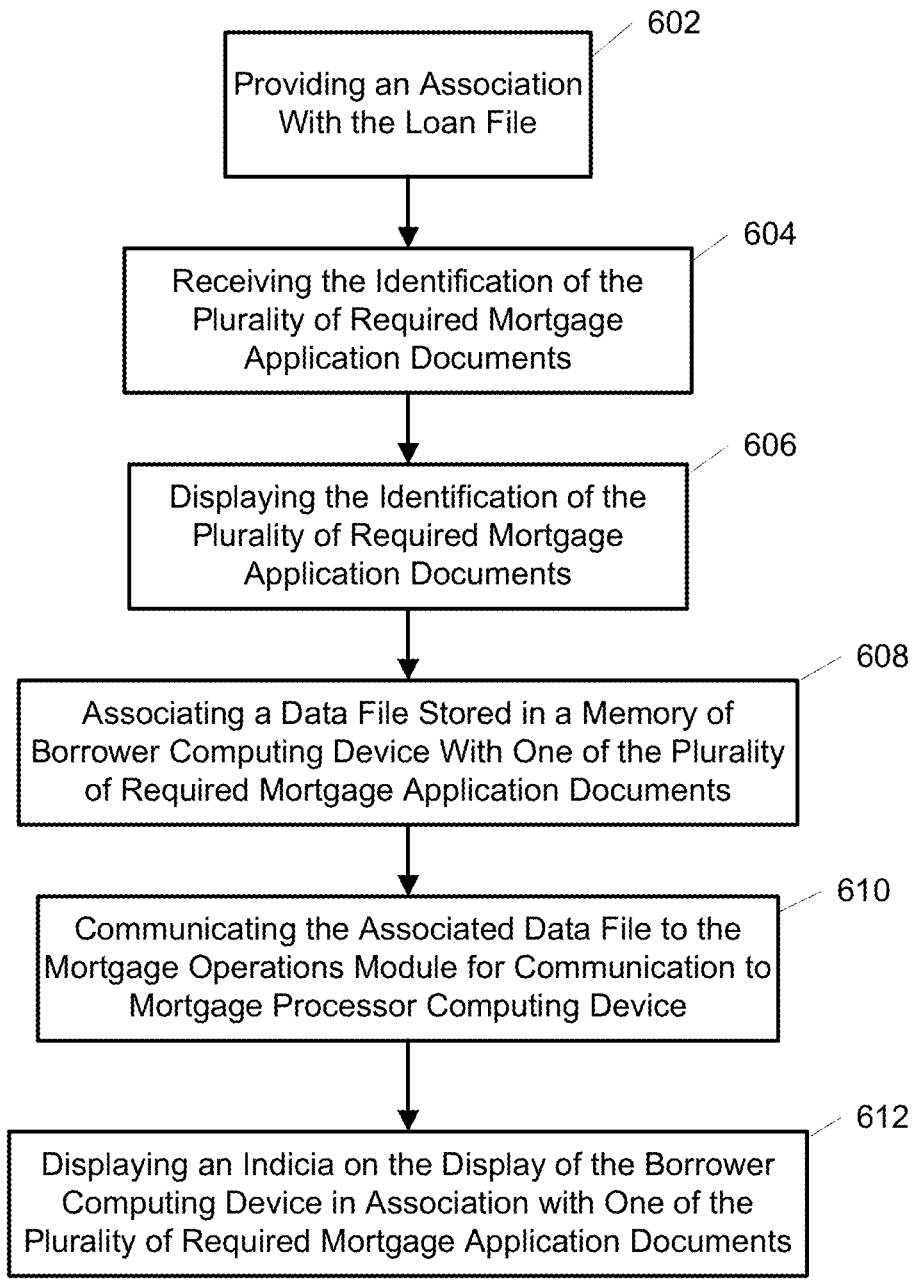
FIG. 6 is an algorithmic flow chart showing exemplary operations of a borrower interface module.

As seen in FIG. 6, borrower interface module 122 may be configured for processing an algorithm that comprises the steps of associating borrower interface module 122 with the loan file at step 602, and receiving the identification of the plurality of required mortgage application documents from server 102 over network 108 at step 604. At step 606, borrower interface module 122 is further configured to implement the algorithm by displaying the identification of the plurality of required mortgage application documents on a display of borrower computing device 106. For example, as seen in FIG. 7C, borrower interface module 122 is operating to display a list 702 of required documents on borrower computing device 106, including, but not limited to, a paystub, a letter of explanation, a W-2 form, a credit report, a driver's license, a bank statement, credit inquiry letter, social security card, and credit disclosure.

At step 608, borrower interface module 122 is configured to further implement the algorithm by associating a data file stored in data store/memory 124 of borrower computing device 106 with one of the plurality of required mortgage application documents. Data file may be any type of document in digital form, including, but not limited to, a pdf document or a digital photograph, for example. As best seen in FIG. 7C, the data file, utilizing an upload function 704, may be uploaded and stored into the memory of borrower computing device 106 from an external source, or borrower interface module 122 may allow for the capture or utilization of a digital image using a digital camera of borrower computing device 106, wherein the digital image represents data file. A view function 710 may also be used to display a data file that has already been communicated to server 102. It should be understood that the process of associating different data files with each of the listed required mortgage application documents may continue in a single session or different sessions until all of the listed required mortgage application documents are accounted for.

At step 610, borrower interface module 122 is further configured to implement the algorithm by communicating the associated data file to mortgage operations module 114 over network 108, wherein mortgage operations module 114 receives the associated data file and communicates 711 the associated data file to mortgage processor computing device 104 (FIG. 7D) so that the associated data file is stored in memory 116 of mortgage processor computing device 104. The content of the associated data file may be stored in memory 120 of server 102, but also may just be communicated to mortgage processor computing device 104. However, the fact that the associated data file was received by the server 102 is stored so that it can be indicated to borrower computing device 106 (FIG. 7E) and mortgage processor device 104 that the corresponding required mortgage application document is no longer required to be provided by borrower computing device 106.

Figure 7B:
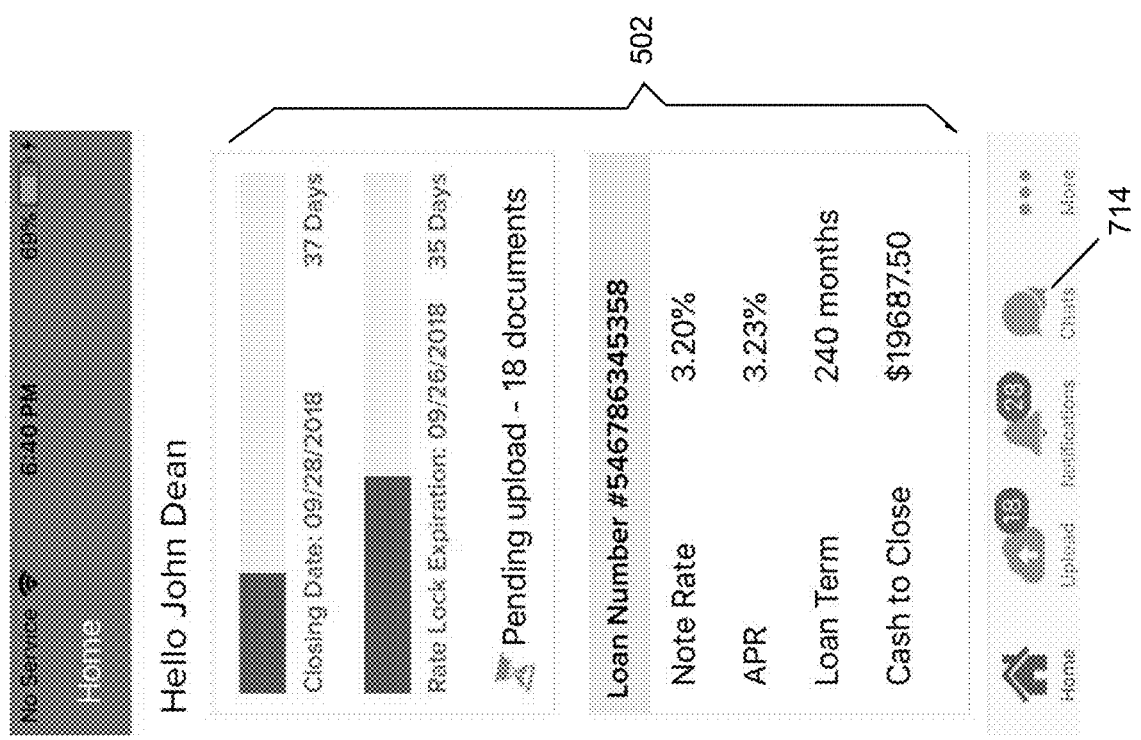
Figure 7C:
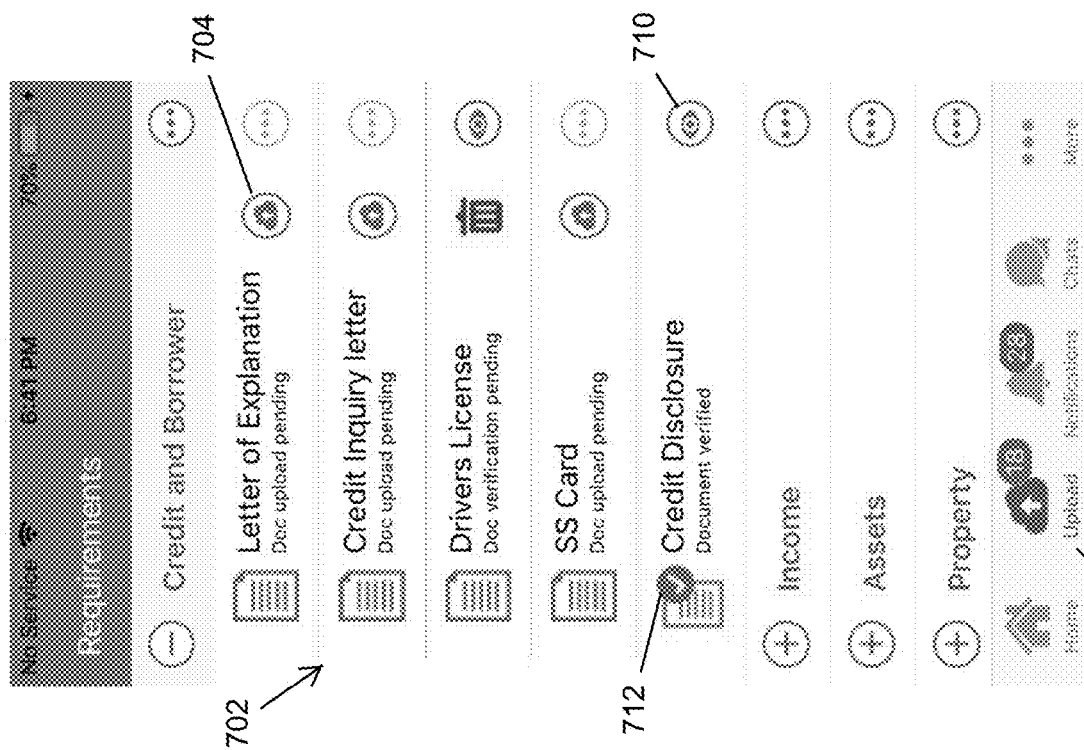
Figure 7D:
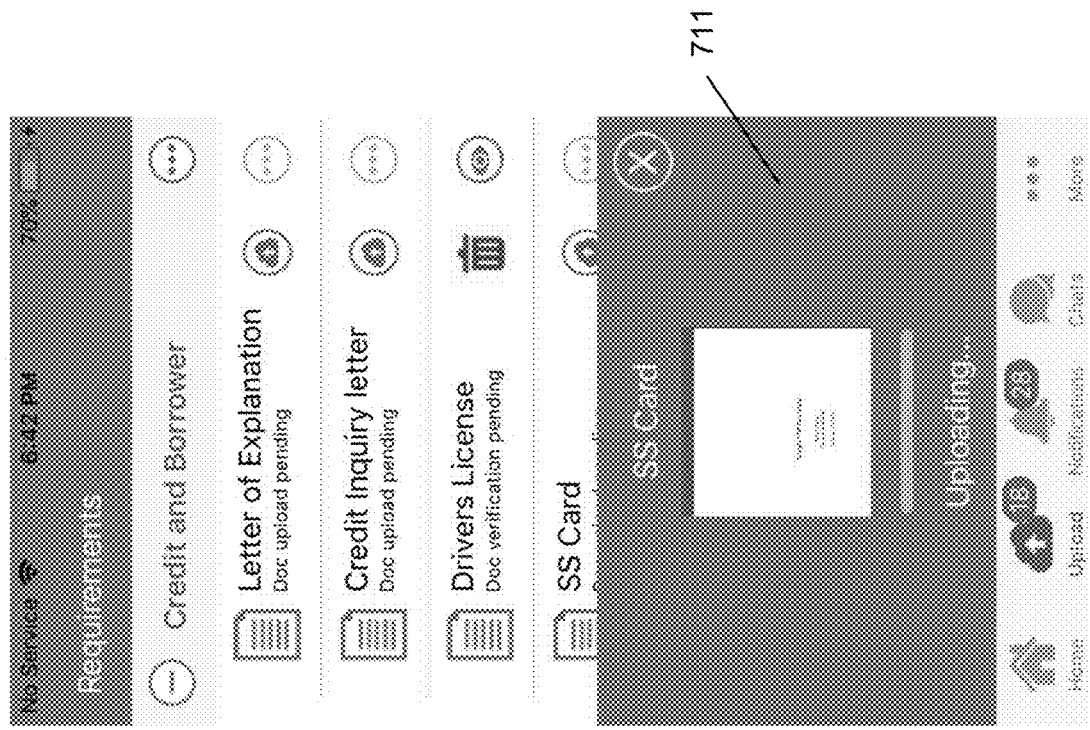
Figure 7E:
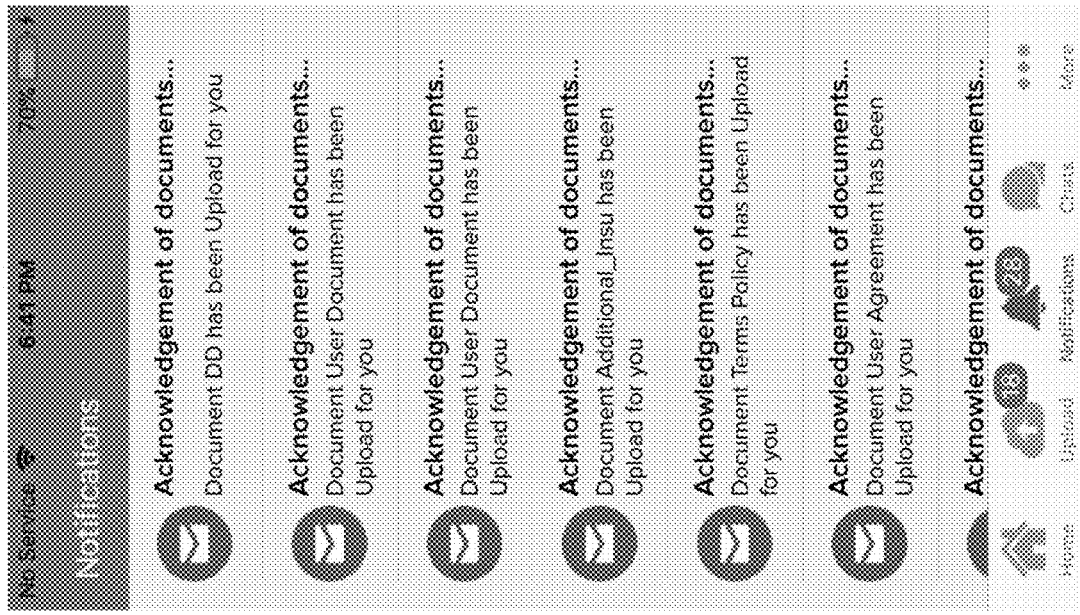

At step 612, as best seen in FIGS. 6 and 7C, borrower interface module 122 is further configured implement the algorithm by displaying an indicia 712 on the display of borrower computing device 106 in association with the one of the plurality of required mortgage application documents 702, wherein indicia 712 represents that the associated data file was communicated to mortgage operations module 114. Indicia 712 may be any type of symbol (e.g., check mark), color (e.g., green), character, text, number, or combination thereof, indicating to a borrower using borrower computing device 106 that the one of the plurality of required mortgage application documents 702 was communicated from borrower computing device 106 to mortgage operations module 114. The associated data file that has been communicated may thereafter be and stored in memory 116 and used in loan origination module 118 to process the subject mortgage application. As such, borrower interface module 122 allows borrower computing device 106 to receive a list of required mortgage application documents from mortgage processor computing device 104 over network 108, efficiently communicate the required documents to server 102 and/or mortgage processor computing device 104, and keep track of the documents that are still required to make the mortgage approval process more transparent and efficient.

Figure 11:
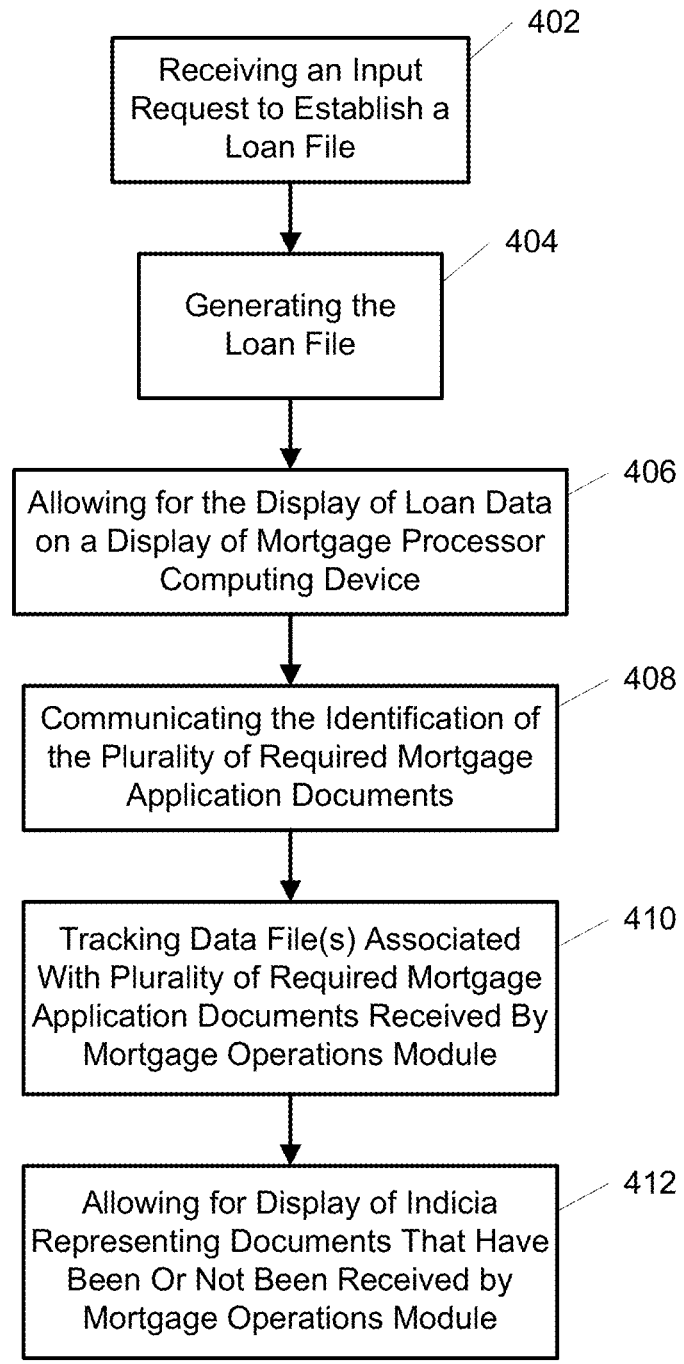
FIG. 11 is another algorithmic flow chart showing exemplary operations of the mortgage operations module.

In accordance with another aspect of the present invention, as best seen in FIG. 11, mortgage operations module 114, utilizing the processor of server 102, is further configured for tracking the associated data file(s) that have been received from borrower computing device 106 at step 410, and allowing for the display of an indicia on the display of mortgage processor computing device 104 representing the required mortgage application documents that have not been received and/or received by mortgage operations module 114 from the respective associated borrower computing device 106 at step 412. For example, the indicia may take the form of a numerical value, wherein if the numerical value is "2", then this is an indication that the borrower still needs to communicate "2" of the required mortgage application documents. Further, mortgage operations module 114 may be configured for allowing for the display of one of a plurality of status indicators on the mortgage processor computing device 104 corresponding to the indicia on the display of the mortgage processor computing device. For instance, plurality of status indicators may be text and/or a plurality of different colors (e.g., red, dark green, light green), wherein each of the colors correspond to the number of required mortgage application documents that still need to be communicated form borrower computing device 106. In one example, if no documents have been communicated from borrower computing device 106 then the status indicator may be red; if all of the documents have been communicated from borrower computing device 106 then the status indicator may be dark green; if some of the documents have been communicated from borrower computing device 106, then the status indicator may be light green. It should be understood that this same methodology may be implemented using different symbols.

Figure 12:
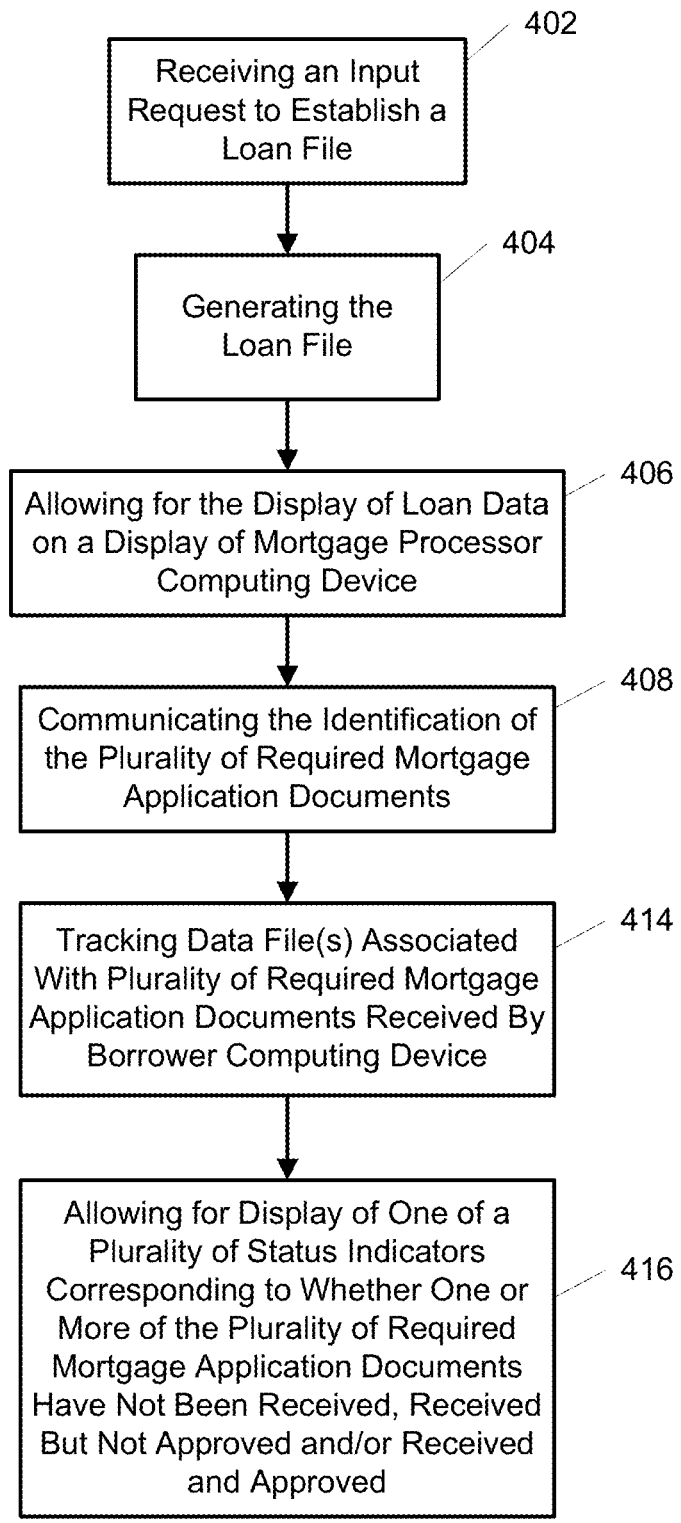
FIG. 12 is yet another algorithmic flow chart showing exemplary operations of the mortgage operations module.

In accordance with another aspect of the present invention, as best seen in FIGS. 5C and 12, mortgage operations module 114, utilizing the processor of server 102, is further configured for tracking that the associated data file(s) that have been received from borrower computing device 106 that correspond to the plurality of required mortgage application documents 503 at step 414, and allowing for the display of first and second lists 508a, 508b on the display of one of a plurality of status indicators 508a, 508b, 508c on the mortgage processor computing device 104 corresponding to whether the required mortgage application document has not been received (508a) by mortgage operations module 104, has been received by mortgage operations module 104 but has not yet been reviewed and approved (508b), or has been received and approved (508c) by mortgage operations module 104 from borrower computing device 106. For example, the plurality of status indicators may be text and/or a plurality of different colors (e.g., red, dark green, light green), wherein each of the colors correspond to the status of the required mortgage application documents within he mortgage application process. In the instance that a required mortgage application document has been received by mortgage operations module 104 but has not yet been reviewed and approved (508b), mortgage operations module 104 is configured for allowing the received document to be approved, rejected or deleted using the respective function 509. The aspects described above provide a visual indicator to the mortgage processor using mortgage processor computing device 104 that will facilitate follow-up communications with borrower computing device 106 if mortgage application documents are still required to complete the process.

Figure 5D:
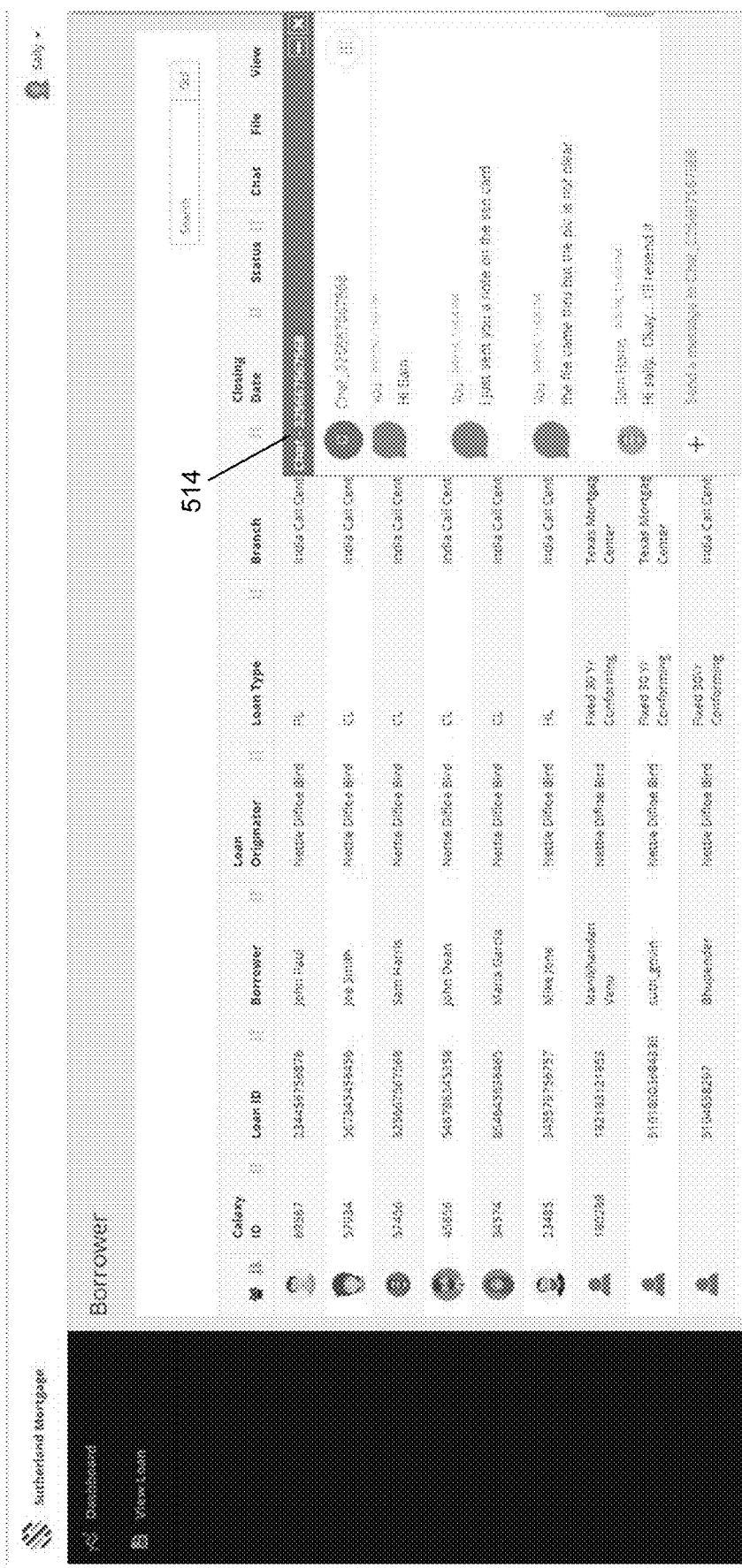
Figure 5E:
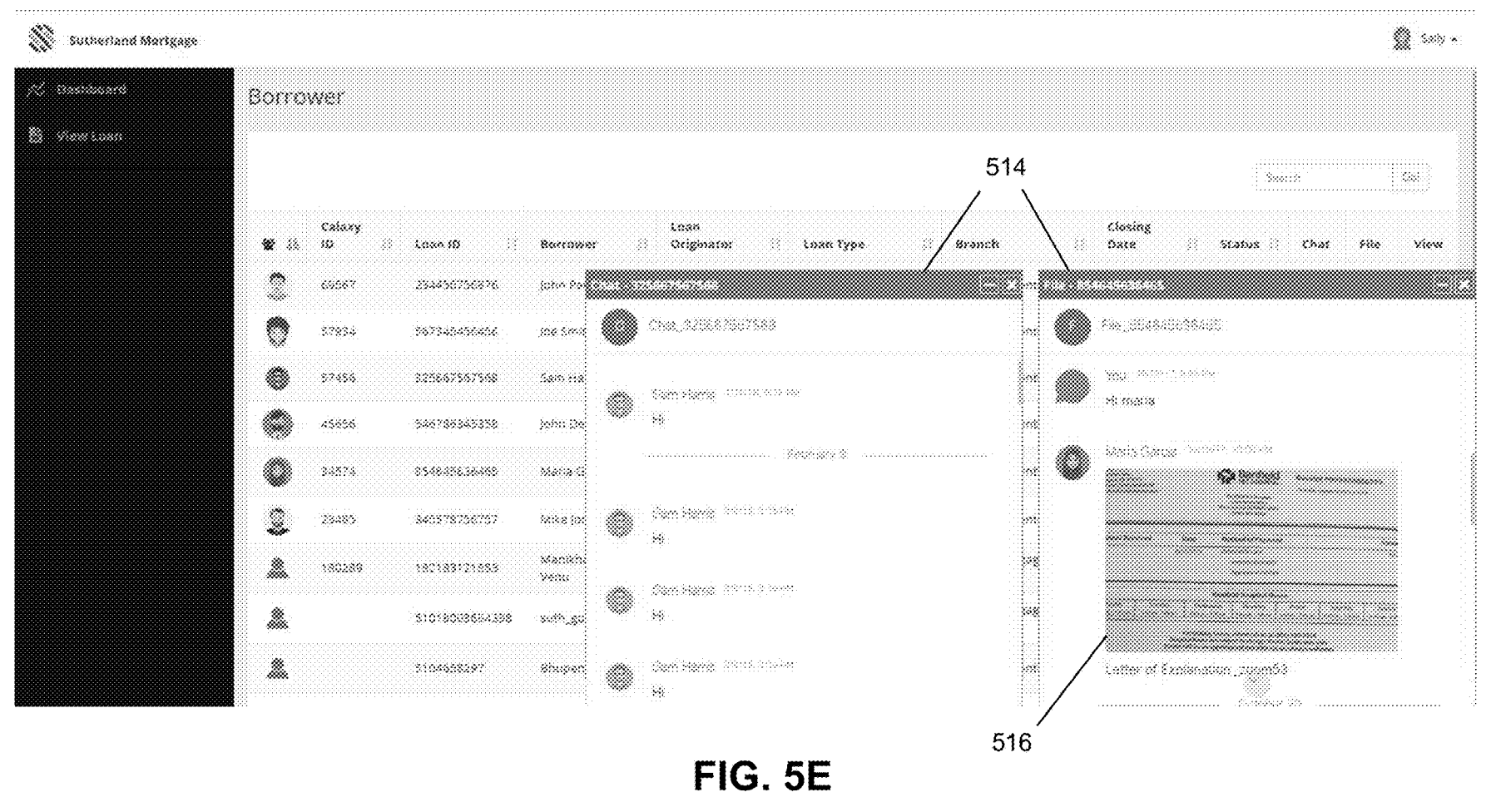
Figure 7F:
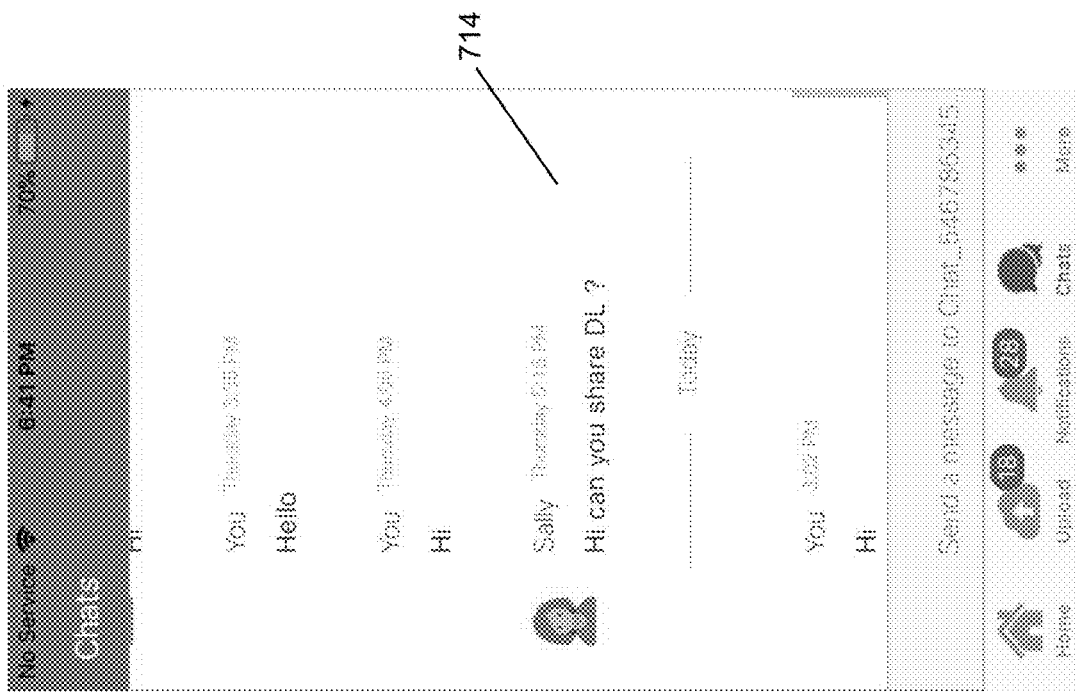
Figure 9:
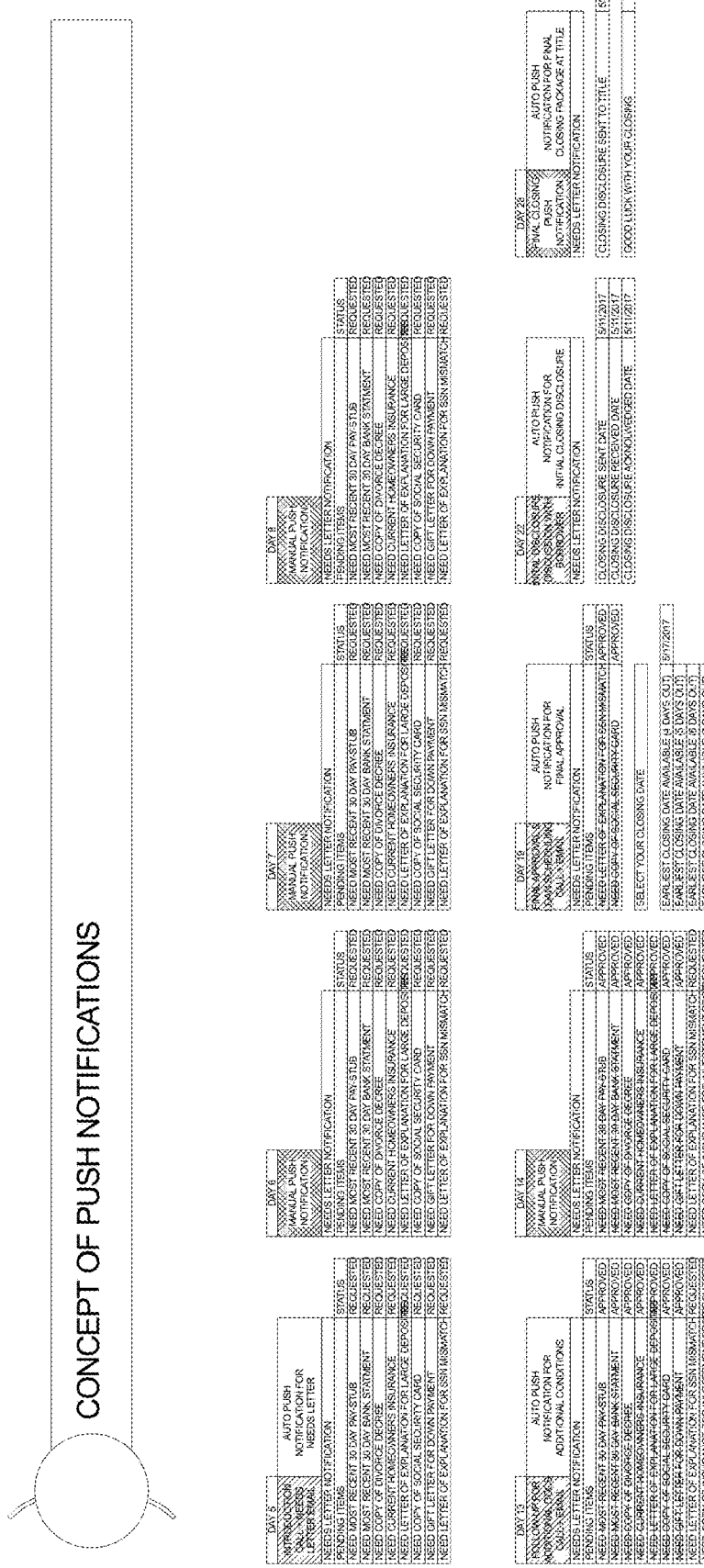
FIG. 9 is an exemplary sequence of push notifications that correspond to the loan closing calendar shown in FIG. 8.
Figure 9I:
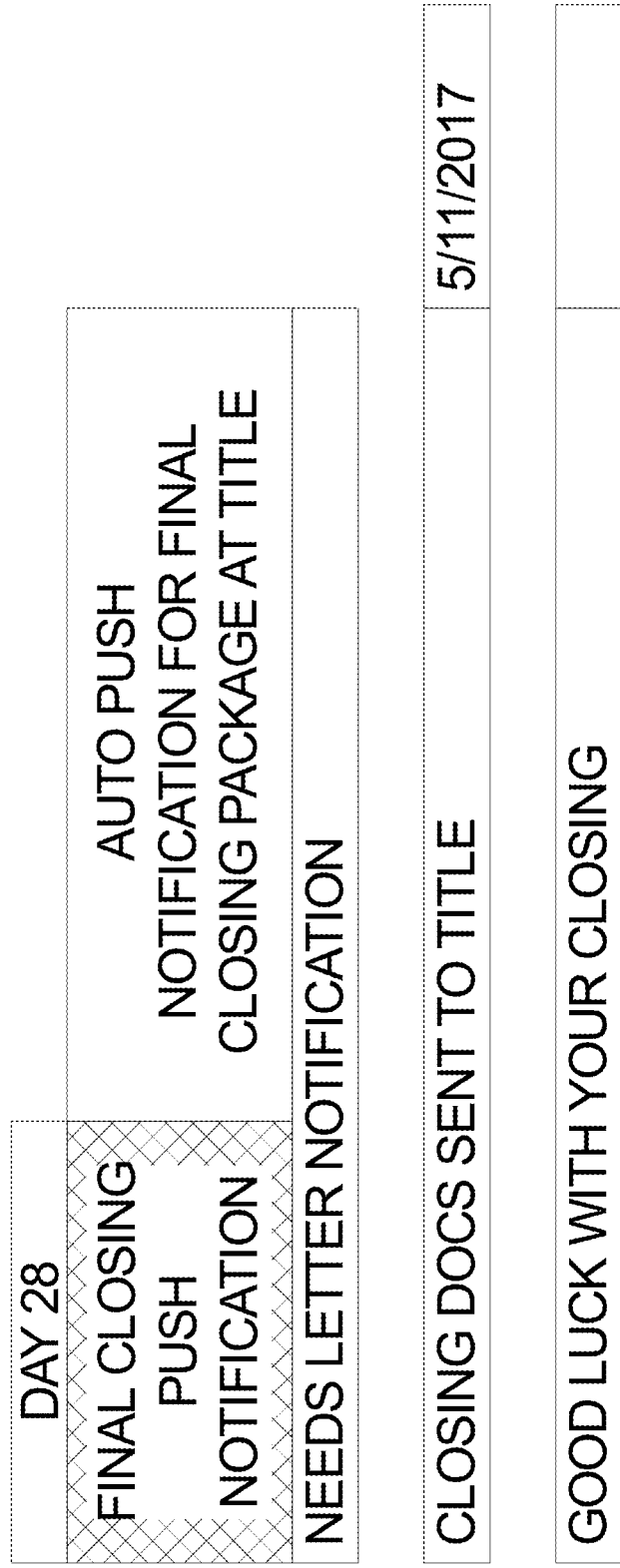

In accordance with another aspect of the present invention, mortgage operations module 114 is configured to facilitate communication between the borrower and mortgage processor computing device 104. For example, as best seen in FIG. 5B, mortgage operations module 114, utilizing the processor of server 102, is further configured for allowing for real-time text chat communication 510 or e-mail communication between mortgage processor computing device 104 and borrower computing device 106 over network 108. As best seen in FIG. 5D, mortgage operations module 114 provides a pop-up window 514 to allow for real-time text chat communication 510, and may also store a record of the last time a chat session was conducted and allow for the display of the chat history when a user interface selection device is hovered above an icon 518 for real-time text chat communication 510. Similar functionality can be provided for e-mail communication as well. As best seen in FIGS. 7B and 7F, borrower interface module 122 is configured to allow for real-time text chat communication 714 that operates in conjunction with real-time text chat communication 510 to provide for a two way line of communication between the borrower and the mortgage processor computing devices 106, 104. As best seen in FIG. 5E, real-time text chat communication 510 may also provide for the communication 516 of data files from borrower computing device 106 to server 102 over network 108.

Figure 5F:
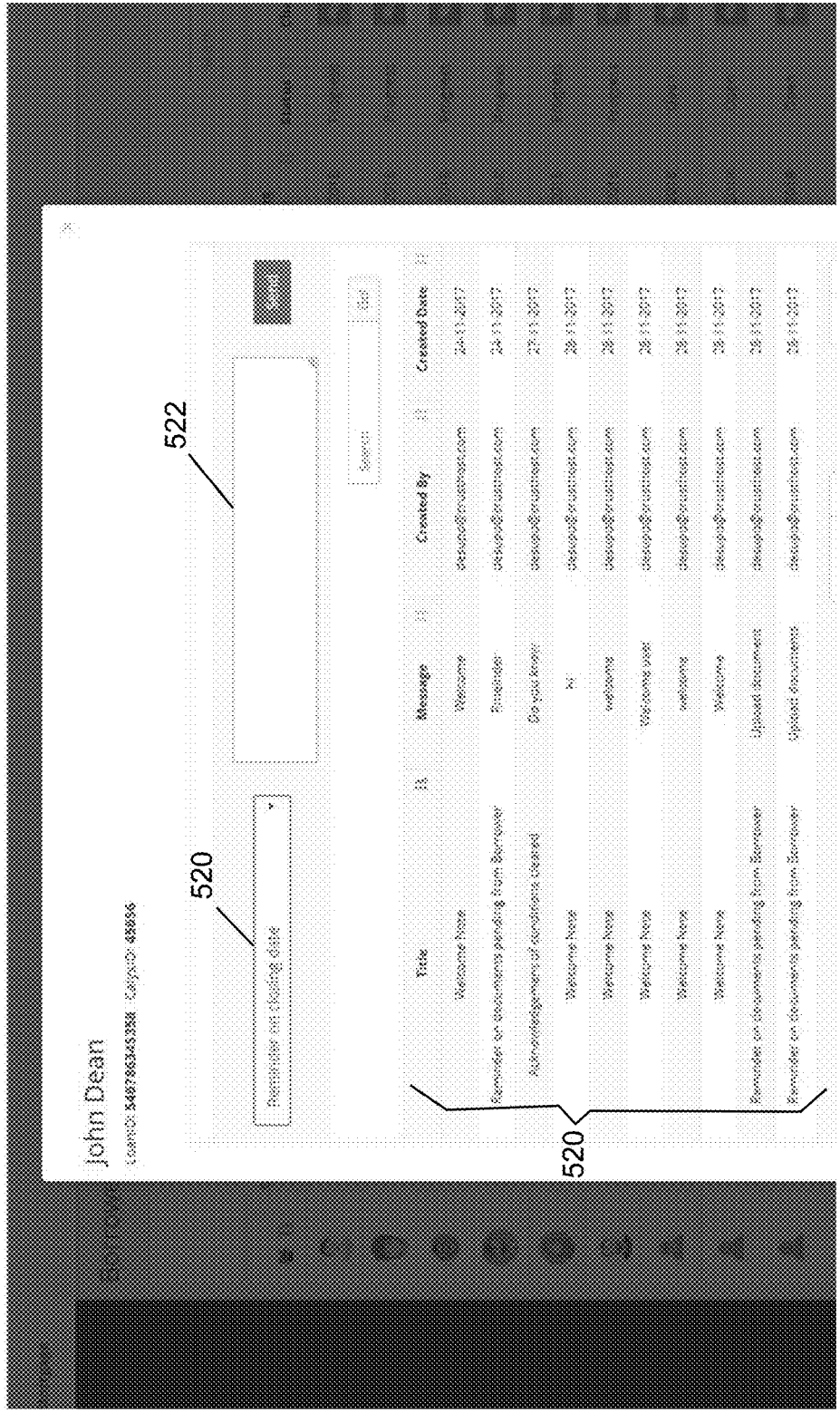

In another aspect of facilitating communication between the borrower computing device 106 and mortgage processor computing device 104, as seen in FIG. 5F, mortgage operations module 114, utilizing the processor of server 102, is further configured for performing the step of allowing for a push notification 520 associated with the loan file to be sent by server 102 and/or mortgage processor computing device 104 to borrower computing device 106 over network 108 so that push notification 520 can be displayed by borrower interface module 122 on borrower computing device 106. It should be understood that push notification 520 may be communicated manually using mortgage processor computing device 104, or automatically generated on a pre-determined specified date or upon occurrence of a milestone of the mortgage fulfillment process. For example, push notification 520 may include a reminder that one or more of the plurality of required mortgage application documents still need to be communicated to mortgage operations module 114, an acknowledgement that one of the plurality of required mortgage application documents has been received by mortgage operations module 114, an acknowledgement that a condition of mortgage approval has cleared, a reminder of a loan closing date, a confirmation related to a closing schedule, and/or an acknowledgement that one or more milestones of the mortgage fulfillment process has been completed. The one or more milestones of the mortgage fulfillment process may include at least one of application completed, submitted for underwriting, conditional approval, final approved, initial closing disclosure issued, or final closing documents issued. Mortgage operations module 114 also provides for a custom notification 522 to be sent to borrower interface module 122. Mortgage operations module 114 is also configured for storing in memory 120 of server 102 an instance (e.g., day and/or time) of the push notification 520 being sent to borrower computing device 106, and allowing for the display of instance on mortgage processor computing device 104.

The ability to provide push notifications to follow up with a borrower, along with one or more of the other functions described herein, may significantly shorten mortgage fulfillment processing times. FIGS. 8, 9, and 9A-9I, show an exemplary loan closing calendar along with a series of corresponding push notifications, and indicators where digital files were received from the borrower computing device. This illustrates a case where the time to closing the loan was reduced to 29 days compared to the 34 days shown in the closing calendar in FIG. 1.

Figure 13:
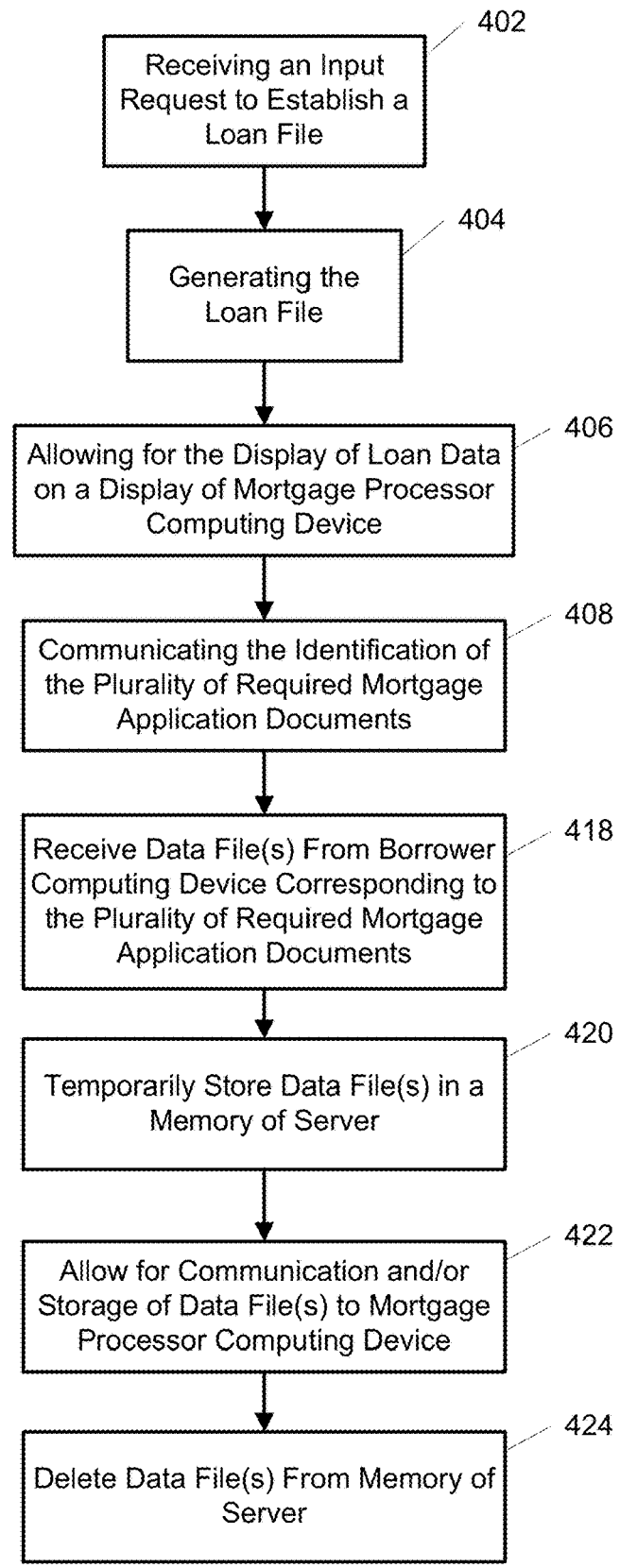
FIG. 13 is a further algorithmic flow chart showing exemplary operations of the mortgage operations module.

Mortgage operations module 114 may include further aspects computer-implemented operations to facilitate the mortgage fulfillment process as seen in FIG. 13. After the associated data file has been received by server 102 from borrower computing device 106 at step 418, mortgage operations module 114 may be configured to allow for the associated data file to be temporarily stored in a secure memory location in server 102 at step 420, and provide for a drag and drop operation to allow mortgage processor computing device 104 to move and store the associated data file in memory 116 of mortgage processor computing device 104 at step 422. This will allow the associated data file to be displayed, analyzed and/or otherwise used by mortgage processor computing device 104 in conjunction with loan origination module 118 to process the subject mortgage application, without retaining a copy of the associated data file in the memory of server 102. For example, the copy of the associated data file in the memory of server 102 may be deleted at step 424 after the drag and drop function has been completed. This process may be advantageous given that sensitive personal identifiable information or other sensitive information may be included in the data files provided by borrower computing device 106. It is therefore desirable to minimize the number of copies of such data files retained during the mortgage approval process, while at the same time allowing for the easy transfer of such data files from borrower computing device 106 to mortgage processor computing device 104. Allowing for the temporary storage of the data files in the member of server 102 and facilitating the transfer of such file to mortgage processor computing device 104 using a drag and drop operation addresses these needs.

Figure 14:
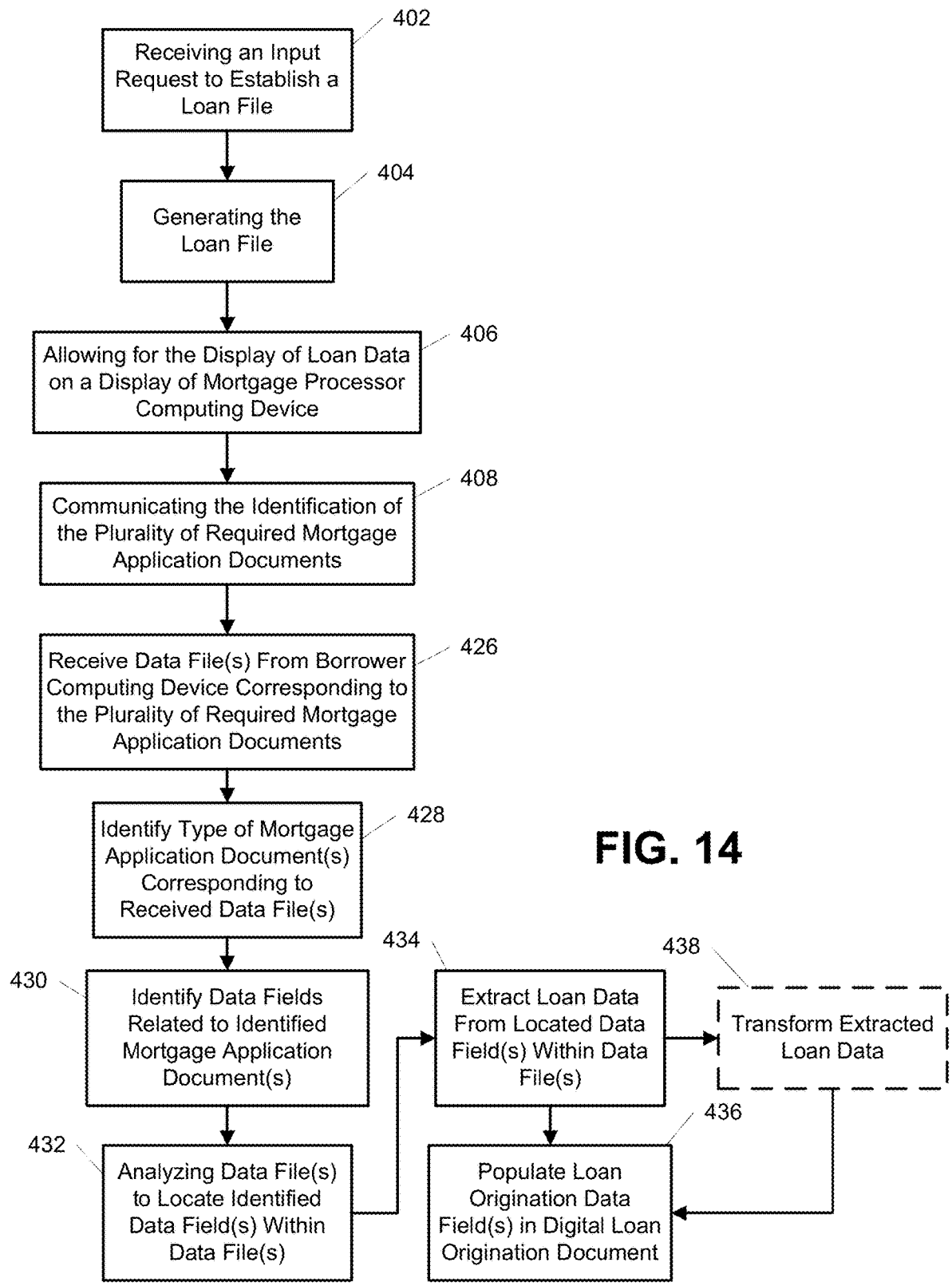
FIG. 14 is another algorithmic flow chart showing exemplary operations of the mortgage operations module.

In another aspect, as best seen in FIG. 14, mortgage operations module 114 may also provide for an automated feature that is configured for automatically populating data into a digital loan origination document that is stored in memory 116 of mortgage processor computing device 104, made available in loan origination module 118, or made available to mortgage operations module 114. The digital loan origination document is a document that needs to be completed during the mortgage fulfillment process, for example, using loan origination module 118. After server 102 receives the associated data file from borrower computing device 106 at step 426, mortgage operations module 114 using processor of server 102 is configured for determining the type of mortgage application document that the received data file is associated with at step 428. The determination can be made based on a receipt of a communication (e.g., a tag) that is manually or automatically generated and associated with the data file by borrower interface module 122 before the data file is sent by borrower computing device 106 to server 102. Alternatively, or in addition, mortgage operations module 114 may be configured for automatically analyzing the received data file to identify the type of mortgage application document that corresponds to the data file, regardless of whether any tagging was provided by borrower interface module 122. After the relevant mortgage application document is determined or otherwise identified, one or more data fields related to the mortgage application document are identified by mortgage operations module 114 at step 430. Mortgage operations module 114, using processor of server 102, is further configured for automatically analyzing the associated data file received from the borrower computing device 106 to locate the identified data fields within the data file relevant to the mortgage application document at step 432. Further, at step 434, mortgage operations module 114 is configured for automatically extracting loan data from the data fields located within the data file. The analyzing and/or extracting of the data file may be performed using at least one of robotics process automation (RPA), screen-scraping, or other tools. The extracted data may be stored in memory 116 and/or memory 120. At step 436, mortgage operations module 114 is further configured for automatically populating at least one of a plurality of loan origination data fields identified in the digital loan origination document with the extracted loan data.

In an example, server 102 may receive a data file from borrower computing device 106 through the use of borrower interface module 122. The data file may be sent to mortgage operations module 114 along with a tag or identifier indicating that the data file represents a W-2 form. This tag or identifier could be, for instance, generated by borrower interface module 122 when the digital file is uploaded using the upload, capture, or utilization functions 704, 706, 708 in association with one of the plurality of required mortgage application documents on list 702. Thus, if borrower interface module 122 tags a data file as a W-2 form prior to sending the data file to the server 102, and server 102 receives the tagged data file, mortgage operations module 114 is configured for determining that the digital file is a W-2 form. In the alternative, borrower interface module 122 may be used to automatically analyze the received data file to determine that it is a W-2 form through image and/or text recognition. Thereafter, one or more data fields related to W-2 forms are provided, determined, or identified by mortgage operations module 114, such as, employee name, employee address, wages earned, etc. Mortgage operations module 114 would then automatically analyze the data file to identify and/or locate the relevant data fields on the data file, and automatically extract loan data from the relevant data fields in the data file. The extracted data may be stored in memory 116 and/or memory 120, and then be used to automatically populate at least one of a plurality of loan origination data fields identified in the digital loan origination document with the extracted loan data.

In addition, at step 438, mortgage operations module 114 is also optionally configured to perform basic calculations using the extracted loan data prior to populating the at least one of the plurality of loan origination data fields in the digital loan origination document to transform the loan data into a form that is required in the digital loan origination document. In an example, if the data file is identified as a bi-weekly pay stub, then mortgage operations module 114 may be configured to perform an automated transformation of data (i.e., calculation), whereby the wage data extracted from the digital file representing the pay stub would be multiplied by 26 to arrive at the annual wages, which is thereafter populated into the digital loan origination document. Extracting information from the data file and auto-populating information into the loan origination document results in the efficient completion of the digital loan origination document using the extracted loan data, and may reduce the number of errors that may have occurred if the information was manually inputted into the loan origination document.

In yet another aspect, as best seen in FIG. 3, at least one of realtor computing device 110 or loan officer computing device 112 is in communication with mortgage operations module 114 over network 108. Realtor computing device 110 or loan officer computing device 112 may be in communication with mortgage operations module 114 through the use of a mobile software application or by logging on to mortgage operations module 114 remotely through the Internet. Mortgage operations module 114, utilizing the processor of server 102, may be further configured for communicating a push notification to at least one of loan officer computing device 112 or realtor computing device 110 over network 108 for displaying on the respective computing device the push notification is associated with the loan file. The push notification may include an acknowledgement that one or more milestones 524 (FIG. 5G) of the mortgage fulfillment process has been completed. Mortgage operations module 114 is further configured for tracking at least one of a loan closing date or a rate lock expiration date, and wherein the push notification may further include at least one of the loan closing date or the rate lock expiration date. Mortgage operations module 114 is also configured for communicating at least one of the loan closing date or the rate lock expiration date to borrower computing device 106 over the network, and allowing the at least one of the loan closing date or the rate lock expiration date to be displayed on the display of borrower computing device 106 using borrower interface module 122.

Figure 10:
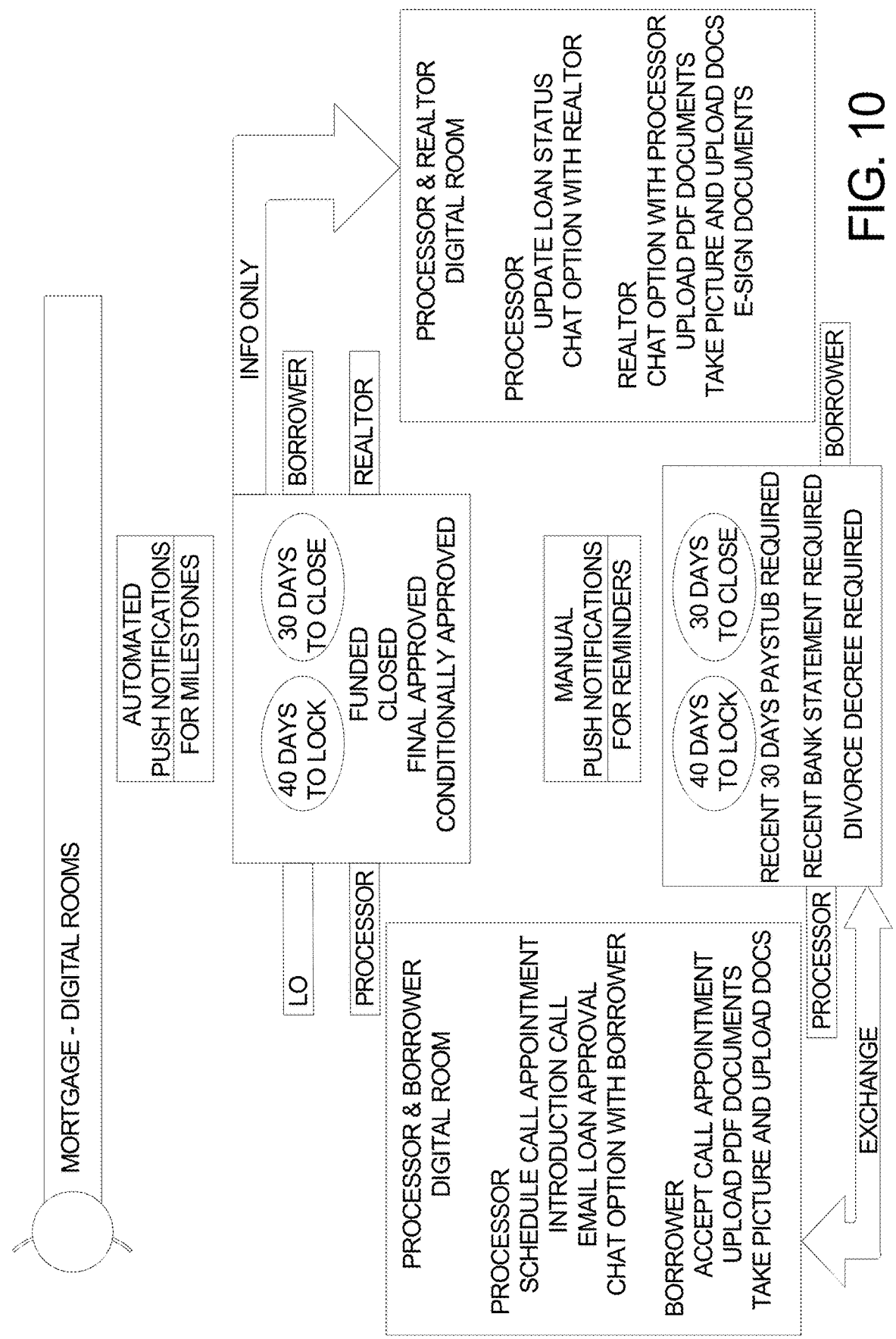
FIG. 10 is an exemplary schematic drawing showing additional access to a loan officer computing device and/or a realtor computing device.

FIG. 10 is an exemplary illustration showing the ability of mortgage operations module 114 and borrower interface module 122 to exchange communications, data, push notifications, and status updates on the progress of the mortgage fulfillment process, while realtor computing device 110 or loan officer computing device 112 are only permitted to view the progress of the mortgage fulfillment process. This aspect keeps the loan officer and realtor informed of the progress of the loan and may increase satisfaction with the mortgage processor. As can be seen in FIG. 10, mortgage operations module 114 may also be configured to provide realtor computing device 110 one or more of the same functions that are provided to borrower through borrower interface module, as described above.

In another aspect, it should be understood that the methods set forth above may be embodied in computer readable instructions stored on a non-transitory computer readable medium.

Having described embodiment number of aspects of the mortgage loan processing system and associated methods, an exemplary computer environment for implementing the mortgage loan processing system is presented next.

Figure 15:
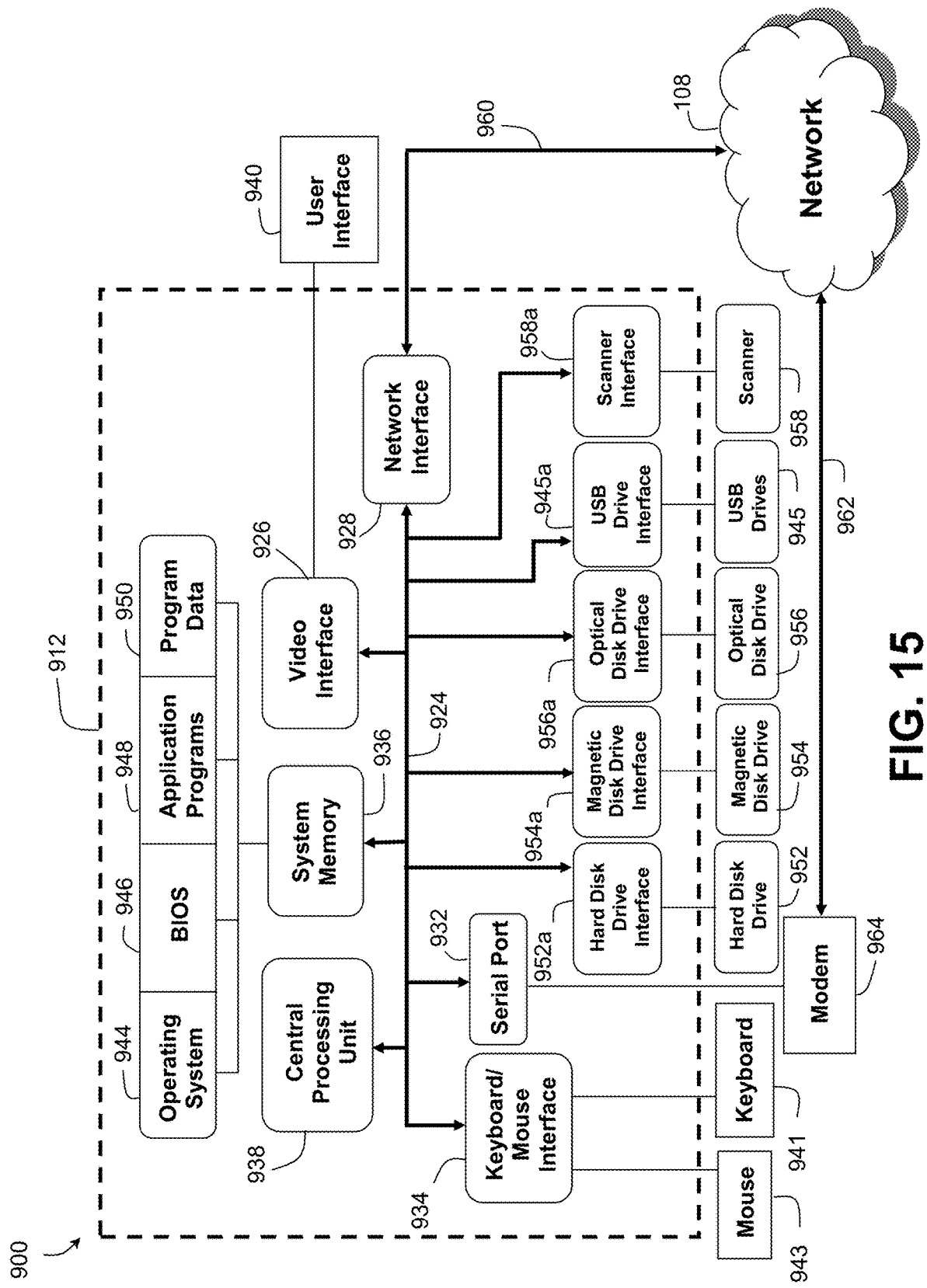
FIG. 15 is a block diagram generally illustrating a computing environment in which the invention may be implemented.

FIG. 15 shows an exemplary computing environment 900 that may be used to implement any of the processing of computer-executable instructions thus far described. Computing environment 900 may be a computer 912 that is representative of server 102, mortgage processor computing device 104, borrower computing device 106, realtor computing device 110, or loan officer computing device 112. For example, computer 912 may include a system bus 924 that couples a video interface 926, network interface 928, one or more serial ports 932, a keyboard/mouse interface 934, and a system memory 936 to a Central Processing Unit (CPU) 938. A monitor or display 940 is connected to bus 924 by video interface 926 and provides the user with a graphical user interface to perform all of the relevant functionality described above. The graphical user interface allows the user to enter commands and information into computer 912 using a keyboard 941 and a user interface selection device 943, such as a mouse, touch screen or other pointing device. Keyboard 941 and user interface selection device are connected to bus 924 through keyboard/mouse interface 934. Display 940 and user interface selection device 943 are used in combination to form the graphical user interface which may allow the user to implement at least a portion of the processes described above with respect to mortgage operations module 114 and/or borrower interface module 122. Other peripheral devices may be connected to computer through serial port 932 or universal serial bus (USB) drives 945 to transfer information to and from computer 912.

The system memory 936 is also connected to bus 924 and may include read only memory (ROM), random access memory (RAM), an operating system 944, a basic input/output system (BIOS) 946, application programs 948 and program data 950. The computer 912 may further include a hard disk drive 952 for reading from and writing to a hard disk, a magnetic disk drive 954 for reading from and writing to a removable magnetic disk (e.g., floppy disk), and an optical disk drive 956 for reading from and writing to a removable optical disk (e.g., CD ROM or other optical media). The computer 912 may also include USB drives 945 and other types of drives for reading from and writing to flash memory devices (e.g., compact flash, memory stick/PRO and DUO, SD card, multimedia card, smart media xD card), and a scanner 958. A hard disk interface 952a, magnetic disk drive interface 954a, an optical drive interface 956a, a USB drive interface 945a, and a scanner interface 958a operate to connect bus 924 to hard disk drive 952, magnetic disk drive 954, optical disk drive 956, USB drive 945 and a scanner 958, respectively. Each of these drive components and their associated computer-readable media may provide computer 912 with non-volatile storage of computer-readable instruction, program modules, data structures, application programs, an operating system, and other data for the computer 912. In addition, it will be understood that computer 912 may also utilize other types of computer-readable media in addition to those types set forth herein, such as digital video disks, random access memory, read only memory, other types of flash memory cards, magnetic cassettes, and the like.

As mentioned above, mortgage operations module 114 may be implemented in a networked environment using logical connections to establish communication between server 102, mortgage processor computing device 104, borrower computing device 106, realtor computing device 110 and/or loan officer computing device 112, as previously described. Network interface 928 provides a communication path 960 between bus 924 and network 108, which allows the instructions, modules, data, sequences, files, designations, notifications, or information described above to be communicated through network 108 between server 102, mortgage processor computing device 104, borrower computing device 106, realtor computing device 110 and/or loan officer computing device 112 using computer 912, as described above. This type of logical network connection is commonly used in conjunction with a local area network (LAN). The instructions, modules, data, sequences, files, designations, notifications, or information may also be communicated from bus 924 through a communication path 962 to network 108 using serial port 932 and a modem 964. Using a modem connection is commonly used in conjunction with a wide area network (WAN). It will be appreciated that the network connections shown herein are merely exemplary, and it is within the scope of the present invention to use other types of network connections between server 102, mortgage processor computing device 104, borrower computing device 106, realtor computing device 110 and/or loan officer computing device 112 including both wired and wireless connections.

As can be appreciated, the system and methods described above overcomes the previously mentioned drawbacks and deficiencies that currently exist in this field by providing a cloud-based mortgage processing platform that provides for all of the functionality set forth above. While the system and methods have been described with reference to a mortgage application process, it should be understood that it is contemplated that the system and methods be used with any type of loan process that requires interaction between a mortgage processor and a borrower.

From the foregoing, it will be seen that this invention is one well adapted to attain all the ends and objects hereinabove set forth together with other advantages which are obvious and which are inherent to the system and method. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A computer-implemented mortgage processing system for facilitating a mortgage fulfillment process between a mortgage processor computing device and a borrower computing device, the system comprising:
 a server including a memory and a processor, wherein the server is in communication with the mortgage processor computing device and the borrower computing device over a network;
 a first set of computer instructions configured for being stored in the memory of the server and executed by the processor of the server to perform the steps of:
  receiving an input request to establish a loan file from the mortgage processor computing device over the network, wherein the input request includes loan data associated with the loan file, wherein the loan data includes an identification of a plurality of required mortgage application documents,
  generating the loan file and associating the loan data with the generated loan file,
  allowing for the display of the loan data associated with the loan file on a display of the mortgage processor computing device, and
  communicating the identification of the plurality of required mortgage application documents to the borrower computing device over the network; and
 a second set of computer instructions configured for being stored in a memory of the borrower computing device and executed by a processor of the borrower computing device to perform the steps of:

receiving the identification of the plurality of required mortgage application documents from the server over the network associated with the loan file;

displaying the identification of the plurality of required mortgage application documents on a display of the borrower computing device;

associating one or more data files stored in the memory of the borrower computing device with one or more of the plurality of required mortgage application documents, respectively; and communicating the one or more associated data files to the server over the network, wherein the server receives the one or more associated data files from the borrower computing device and makes the one or more associated data files available to the mortgage processor computing device, and wherein, after the server receives the one or more associated data files, the first set of computer instructions is further configured for performing the steps of:

temporarily storing the one or more associated data files received by the server from the borrower computing device in a secure location of the memory of the server;

receiving input from the mortgage processor computing device to perform a drag and drop operation that allows for the one or more associated data files to be transferred from the server to the mortgage processor computing device;

communicating the one or more associated data files from the memory of the server to the mortgage processor computing device in response to the received input associated with the drag and drop operation so that the one or more associated data files are stored in a memory of the mortgage processor computing device; and automatically deleting the one or more associated data files from the secure location in the memory of the server after completion of the transfer to the mortgage processor computing device via the drag and drop operation.

2. A system in accordance with claim 1, wherein the second set of computer instructions is further configured for performing the step of:

displaying an indicia on the display of the borrower computing device in association with the one or more of the plurality of required mortgage application documents, wherein the indicia represents that the one or more associated data files were communicated from the borrower computing device to the server.

3. A system in accordance with claim 1, wherein the first set of computer instructions is further configured for performing the steps of:

tracking data files associated with the plurality of required mortgage application documents that have been received by the server from the borrower computing device; and allowing for the display of an indicia and a plurality of status indicators corresponding to the indicia on the display of the mortgage processor computing device in association with the plurality of required mortgage application documents, wherein the indicia represents associated data files that have been received and/or have not been received by the server from the borrower computing device, and wherein the status indicators correspond to a number of associated data files that have been communicated and/or still need to be communicated from the borrower computing device to the server.

4. A system in accordance with claim 1, wherein the first set of computer instructions is further configured for performing the steps of:

tracking data files associated with the plurality of required mortgage application documents that have been received by the server from the borrower computing device; and allowing for the display of a plurality of status indicators corresponding to a status of the plurality of required mortgage application documents within the mortgage application process on the display of the mortgage processor computing device, wherein the status indicators correspond to whether the associated data file has not been received, has been received but not yet approved, and/or has been both received and approved, respectively.

5. A system in accordance with claim 1, wherein the second set of computer instructions is further configured for performing one or more of the steps of:

allowing for real-time text chat communication between the mortgage processor computing device and the borrower computing device over the network;

allowing for the display of the one or more associated data files communicated from the borrower computing device to the server over the network; and allowing for the display of the loan data associated with the loan file on the display of the borrower computing device.

6. A system in accordance with claim 1, wherein the first set of computer instructions is further configured for performing the steps of:

allowing for a push notification associated with the loan file to be sent to the borrower computing device over the network for display on the display of the borrower computing device, wherein the push notification includes at least one of:

a reminder that one or more of the plurality of required mortgage application documents still need to be communicated to the server, an acknowledgement that one or more of the plurality of required mortgage application documents have been received by the server, an acknowledgement that a condition of mortgage approval has cleared, a reminder of a loan closing date, a confirmation related to a closing schedule, and/or an acknowledgement that one or more milestones of the mortgage fulfillment process has been completed;

storing in the memory of the server an instance of the push notification being sent to the borrower computing device; and allowing for the display of the instance on the mortgage processor computing device, wherein the instance indicates a day and/or time that the push notification was sent to the borrower computing device.

7. A system in accordance with claim 1, wherein a loan origination document is stored in a memory of the mortgage processor computing device, wherein the loan origination document includes a plurality of loan origination data fields configured for receiving loan data, and wherein, after the server receives the one or more associated data files from the borrower computing device, and wherein the first set of computer instructions is further configured for performing the steps of:

identifying a type of mortgage application document corresponding to each of the one or more associated data files received by the server;

identifying one or more data fields related to the identified type of mortgage application document;

analyzing the one or more associated data files to locate the one or more identified data fields within the one or more associated data files;

analyzing the one or more associated data files, using at least one of robotics process automation (RPA) or screen-scraping, to extract loan data from the one or more identified data fields related to the mortgage application document that are included in the one or more associated data files; and automatically populating one or more of the plurality of loan origination data fields with the extracted loan data.

8. A system in accordance with claim 7, wherein the first set of computer instructions is further configured for performing the step of:

modifying or transforming the loan data extracted from the one or more identified data fields in the one or more associated data files prior to automatically populating the one or more of the plurality of loan origination data fields with the extracted loan data.

9. A system in accordance with claim 1, wherein the first set of computer instructions is further configured for performing the steps of:

tracking at least one of a loan closing date or a rate lock expiration date;

communicating the at least one of the loan closing date or the rate lock expiration date to the borrower computing device over the network; and allowing for the display of the at least one of the loan closing date or the rate lock expiration date on the display of the borrower computing device.

10. A system in accordance with claim 1, wherein at least one of a loan officer computing device or a realtor computing device is in communication with the server over the network, and wherein the first set of computer instructions is further configured for performing the step of:

allowing for a push notification associated with the loan file to be sent to at least one of the loan officer computing device or the realtor computing device over the network for display on the respective computing device, wherein the push notification includes at least one of an acknowledgement that one or more milestones of the mortgage fulfillment process has been completed, a rate lock expiration date and/or a loan closing date.

11. A method programmed for execution in a computing environment for facilitating a mortgage fulfillment process between a mortgage processor computing device and a borrower computing device, wherein the mortgage processor computing device and the borrower computing device are in communication with a server over a network, the server including a processor and a memory having computer instructions stored therein, the processor configured for executing the computer instructions for performing the method comprising:

receiving an input request to establish a loan file from the mortgage processor computing device over the network, wherein the input request includes loan data associated with the loan file, and wherein the loan data includes an identification of a plurality of required mortgage application documents;

generating the loan file and associating the loan data with the generated loan file;

allowing for the display of the loan data associated with the loan file on a display of the mortgage processor computing device;

communicating the identification of the plurality of required mortgage application documents to the borrower computing device over the network;

receiving one or more data files associated with one or more of the plurality of required mortgage application documents, respectively, from the borrower computing device over the network; and making the one or more associated data files available to the mortgage processor computing device over the network, wherein, after the server receives the one or more associated data files, the method further comprises:

temporarily storing the one or more associated data files received by the server from the borrower computing device in a secure location of the memory of the server;

receiving input from the mortgage processor computing device to perform a drag and drop operation that allows for the one or more associated data files to be transferred from the server to the mortgage processor computing device;

communicating the one or more associated data files from the memory of the server to the mortgage processor computing device in response to the received input associated with the drag and drop operation so that the one or more associated data files are stored in a memory of the mortgage processor computing device; and automatically deleting the one or more associated data files from the secure location in the memory of the server after completion of the transfer to the mortgage processor computing device via the drag and drop operation.

12. A method in accordance with claim 11, further comprising:

allowing for the display of an indicia on the display of the borrower computing device in association with the one or more of the plurality of required mortgage application documents, wherein the indicia represents that the one or more associated data files were communicated from the borrower computing device to the server.

13. A method in accordance with claim 11, the method further comprising:

tracking data files associated with the plurality of required mortgage application documents that have been received by the server from the borrower computing device; and allowing for the display of an indicia and a plurality of status indicators corresponding to the indicia on the display of the mortgage processor computing device in association with the plurality of required mortgage application documents, wherein the indicia represents associated data files that have been received and/or have not been received by the server from the borrower computing device, and wherein the status indicators correspond to a number of associated data files that have been communicated and/or still need to be communicated from the borrower computing device to the server.

14. A method in accordance with claim 11, the method further comprising:

tracking data files associated with the plurality of required mortgage application documents that have been received by the server from the borrower computing device; and allowing for the display of a plurality of status indicators corresponding to a status of the plurality of required mortgage application documents within the mortgage application process on the display of the mortgage processor computing device, wherein the status indicators correspond to whether the associated data file has not been received, has been received but not yet approved, and/or has been both received and approved, respectively.

15. A method in accordance with claim 11, the method further comprising one or more of:

allowing for real-time text chat communication between the mortgage processor computing device and the borrower computing device over the network;

allowing for the display of the one or more associated data files communicated from the borrower computing device to the server over the network; and allowing for the display of the loan data associated with the loan file on the display of the borrower computing device.

16. A method in accordance with claim 11, the method further comprising:

allowing for a push notification associated with the loan file to be sent to the borrower computing device over the network for display on the display of the borrower computing device, wherein the push notification includes at least one of:

a reminder that one or more of the plurality of required mortgage application documents still need to be communicated to the server, an acknowledgement that one or more of the plurality of required mortgage application documents have been received by the server, an acknowledgement that a condition of mortgage approval has cleared, a reminder of a loan closing date, a confirmation related to a closing schedule, and/or an acknowledgement that one or more milestones of the mortgage fulfillment process has been completed;

storing in the memory of the server an instance of the push notification being sent to the borrower computing device; and allowing for the display of the instance on the mortgage processor computing device, wherein the instance indicates a day and/or time that the push notification was sent to the borrower computing device.

17. A method in accordance with claim 11, wherein a loan origination document is stored in a memory of the mortgage processor computing device, wherein the loan origination document includes a plurality of loan origination data fields configured for receiving loan data, and wherein, after the server receives the one or more associated data files from the borrower computing device, the method further comprising:

identifying a type of mortgage application document corresponding to each of the one or more associated data files received by the server;

identifying one or more data fields related to the identified type of mortgage application document;

analyzing the one or more associated data files to locate the one or more identified data fields within the one or more associated data files;

analyzing the one or more associated data files, using at least one of robotics process automation (RPA) or screen-scraping, to extract loan data from the one or more identified data fields related to the mortgage application document that are included in the one or more associated data files; and automatically populating one or more of the plurality of loan origination data fields with the extracted loan data.

18. A method in accordance with claim 17, the method further comprising:

modifying or transforming the loan data extracted from the one or more identified data fields in the one or more associated data files prior to automatically populating the one or more of the plurality of loan origination data fields with the extracted loan data.

19. A method in accordance with claim 11, the method further comprising:

tracking at least one of a loan closing date or a rate lock expiration date;

communicating the at least one of the loan closing date or the rate lock expiration date to the borrower computing device over the network; and allowing for the display of the at least one of the loan closing date or the rate lock expiration date on the display of the borrower computing device.

20. A method in accordance with claim 11, wherein at least one of a loan officer computing device or a realtor computing device is in communication with the server over the network, the method further comprising:

allowing for a push notification associated with the loan file to be sent to at least one of the loan officer computing device or the realtor computing device over the network for display on the respective computing device, wherein the push notification includes at least one of an acknowledgement that one or more milestones of the mortgage fulfillment process has been completed, a rate lock expiration date and/or a loan closing date.

21. A non-transitory computer-readable storage medium having instructions stored thereon for execution by a processor of a server for implementing a method facilitating a mortgage fulfillment process between a mortgage processor computing device and a borrower computing device, wherein the mortgage processor computing device and a borrower computing device are in communication with the server over a network, the method comprising:

receiving an input request to establish a loan file from the mortgage processor computing device over the network, wherein the input request includes loan data associated with the loan file, and wherein the loan data includes an identification of a plurality of required mortgage application documents;

generating the loan file and associating the loan data with the generated loan file;

allowing for the display of the loan data associated with the loan file on a display of the mortgage processor computing device;

communicating the identification of the plurality of required mortgage application documents to the borrower computing device over the network;

receiving a data file associated with one of the plurality of required mortgage application documents from the borrower computing device over the network; and making the one or more associated data files available to the mortgage processor computing device over the network, wherein, after the server receives the one or more associated data files, the method further comprises:

temporarily storing the one or more associated data files received by the server from the borrower computing device in a secure location of the memory of the server;

receiving input from the mortgage processor computing device to perform a drag and drop operation that allows for the one or more associated data files to be transferred from the server to the mortgage processor computing device;

communicating the one or more associated data files from the memory of the server to the mortgage processor computing device in response to the received input associated with the drag and drop operation so that the one or more associated data files are stored in a memory of the mortgage processor computing device; and automatically deleting the one or more associated data files from the secure location in the memory of the server after completion of the transfer to the mortgage processor computing device via the drag and drop operation.

22. A non-transitory computer-readable storage medium in accordance with claim 21, the method further comprising:

allowing for the display of an indicia on the display of the borrower computing device in association with the one or more of the plurality of required mortgage application documents, wherein the indicia represents that the one or more associated data files were communicated from the borrower computing device to the server.

23. A non-transitory computer-readable storage medium in accordance with claim 21, the method further comprising:

tracking data files associated with the plurality of required mortgage application documents that have been received by the server from the borrower computing device; and allowing for the display of an indicia and a plurality of status indicators corresponding to the indicia on the display of the mortgage processor computing device in association with the plurality of required mortgage application documents, wherein the indicia represents associated data files that have been received and/or have not been received by the server from the borrower computing device, and wherein the status indicators correspond to a number of associated data files that have been communicated and/or still need to be communicated from the borrower computing device to the server.

24. A non-transitory computer-readable storage medium in accordance with claim 21, the method further comprising:

tracking data files associated with the plurality of required mortgage application documents that have been received by the server from the borrower computing device; and allowing for the display of a plurality of status indicators corresponding to a status of the plurality of required mortgage application documents within the mortgage application process on the display of the mortgage processor computing device, wherein the status indicators correspond to whether the associated data file has not been received, has been received but not yet approved, and/or has been both received and approved, respectively.

25. A non-transitory computer-readable storage medium in accordance with claim 21, the method further comprising at least one of:

allowing for real-time text chat communication between the mortgage processor computing device and the borrower computing device over the network;

allowing for the display of the one or more associated data files communicated from the borrower computing device to the server over the network; and allowing for the display of the loan data associated with the loan file on the display of the borrower computing device.

26. A non-transitory computer-readable storage medium in accordance with claim 21, the method further comprising:

allowing for a push notification associated with the loan file to be sent to the borrower computing device over the network for display on the display of the borrower computing device, wherein the push notification includes at least one of:

a reminder that one or more of the plurality of required mortgage application documents still need to be communicated to the server, an acknowledgement that one or more of the plurality of required mortgage application documents have been received by the server, an acknowledgement that a condition of mortgage approval has cleared, a reminder of a loan closing date, a confirmation related to a closing schedule, and/or an acknowledgement that one or more milestones of the mortgage fulfillment process has been completed;

storing in the memory of the server an instance of the push notification being sent to the borrower computing device; and allowing for the display of the instance on the mortgage processor computing device, wherein the instance indicates a day and/or time that the push notification was sent to the borrower computing device.

27. A non-transitory computer-readable storage medium in accordance with claim 21, wherein a loan origination document is stored in a memory of the mortgage processor computing device, wherein the loan origination document includes a plurality of loan origination data fields configured for receiving loan data, and wherein, after the server receives the one or more associated data files from the borrower computing device, the method further comprising:

identifying a type of mortgage application document corresponding to each of the one or more associated data files received by the server;

identifying one or more data fields related to the identified type of mortgage application document;

analyzing the one or more associated data files to locate the one or more identified data fields within the one or more associated data files;

analyzing the one or more associated data files, using at least one of robotics process automation (RPA) or screen-scraping, to extract loan data from the one or more identified data fields related to the mortgage application document that are included in the one or more associated data files; and automatically populating one or more of the plurality of loan origination data fields with the extracted loan data.

28. A non-transitory computer-readable storage medium in accordance with claim 27, the method further comprising:

modifying or transforming the loan data extracted from the one or more identified data fields in the one or more associated data files prior to automatically populating the one or more of the plurality of loan origination data fields with the extracted loan data.

29. A non-transitory computer-readable storage medium in accordance with claim 21, the method further comprising:
- tracking at least one of a loan closing date or a rate lock expiration date;
- communicating the at least one of the loan closing date or the rate lock expiration date to the borrower computing device over the network; and
- allowing for the display of the at least one of the loan closing date or the rate lock expiration date on the display of the borrower computing device.

30. A non-transitory computer-readable storage medium in accordance with claim 21, wherein at least one of a loan officer computing device or a realtor computing device is in communication with the server over the network, the method further comprising:
- allowing for a push notification associated with the loan file to be sent to at least one of the loan officer computing device or the realtor computing device over the network for display on the respective computing device,
- wherein the push notification includes at least one of an acknowledgement that one or more milestones of the mortgage fulfillment process has been completed, a rate lock expiration date and/or a loan closing date.

* * * * *